US009800850B2

(12) United States Patent
Schreiber et al.

(10) Patent No.: US 9,800,850 B2
(45) Date of Patent: Oct. 24, 2017

(54) PROJECTION DISPLAY WITH MULTI-CHANNEL OPTICS WITH NON-CIRCULAR OVERALL APERTURE

(71) Applicant: Fraunhofer-Gesellschaft zur Foerderung der angewandten Forschung e.V., Munich (DE)

(72) Inventors: Peter Schreiber, Jena (DE); Marcel Sieler, Jena (DE)

(73) Assignee: FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 14/535,552

(22) Filed: Nov. 7, 2014

(65) Prior Publication Data

US 2015/0062446 A1    Mar. 5, 2015

Related U.S. Application Data

(63) Continuation of application No. PCT/EP2013/059674, filed on May 8, 2013.

(30) Foreign Application Priority Data

May 8, 2012 (DE) .................. 10 2012 207 621

(51) Int. Cl.
 *H04N 9/31* (2006.01)
 *G03B 21/14* (2006.01)
 *G02B 3/00* (2006.01)

(52) U.S. Cl.
 CPC ........... *H04N 9/3179* (2013.01); *G03B 21/14* (2013.01); *H04N 9/317* (2013.01); *H04N 9/3173* (2013.01); *H04N 9/3185* (2013.01); *G02B 3/0056* (2013.01)

(58) Field of Classification Search
 None
 See application file for complete search history.

(56) References Cited

U.S. PATENT DOCUMENTS 6,583,938 B1    6/2003    Woodgate et al.
8,777,424 B2    7/2014    Schreiber et al.
 (Continued)

FOREIGN PATENT DOCUMENTS

DE    10 2009 024 894 A1    12/2010
DE    10 2011 076 083 A1    11/2012
 (Continued)

OTHER PUBLICATIONS

Official Communication issued in corresponding Japanese Patent Application No. 2015-510824, mailed on Dec. 15, 2015.
 (Continued)

*Primary Examiner* — Michael Teitelbaum
(74) *Attorney, Agent, or Firm* — Keating & Bennett, LLP

(57) ABSTRACT

A projection display is provided with an imager that is implemented to generate individual images in a distribution of sub-areas of an imaging plane of the imager. The projection display also includes a multi-channel optics, which is configured to map one allocated sub-area of the imager each per channel, such that the mappings of the individual images are combined to an overall image in a projection area. At least some channels of the multi-channel optics are arranged along at least one curve which is similar to at least one elongated image feature of the overall image, so that a two-dimension anisotropic out-of-focus behavior of each projected image point is obtained. In this way, a large depth of focus range can be combined with relatively high projection brightness without having to accept losses with respect to the focused illustration of image features that are to be projected with sufficient focus.

14 Claims, 19 Drawing Sheets

(56) References Cited

U.S. PATENT DOCUMENTS

| | | | |
|---|---|---|---|
| 2010/0328659 A1 | 12/2010 | Bodkin | |
| 2011/0228231 A1* | 9/2011 | Schreiber | G02B 3/0056 353/31 |
| 2011/0304825 A1 | 12/2011 | Sieler et al. | |
| 2014/0146290 A1 | 5/2014 | Sieler et al. | |
| 2014/0327750 A1* | 11/2014 | Malachowsky | H04N 5/232 348/61 |

FOREIGN PATENT DOCUMENTS

| | | |
|---|---|---|
| JP | 61-128631 U | 8/1986 |
| JP | 2012-3232 A | 1/2012 |
| KR | 10-2001-0086251 A | 9/2001 |
| WO | 97/22032 A1 | 6/1997 |
| WO | 2010/145784 A1 | 12/2010 |
| WO | 2012/155237 A1 | 11/2012 |

OTHER PUBLICATIONS

Geissler, E., "Meeting the Challenges of Developing LED-based Projection Displays", Proc. of SPIE, vol. 6196, No. 619601-1, 2006, 12 pages.

Sieler, M. et. al., "Ultraslim Fixed Pattern Projectors with Inherent Homogenization of Illumination", Applied Optics, vol. 51, No. 1, Jan. 1, 2012, pp. 64-74.

Grosse, M. et. al., "Coded Aperture Projection", ACM Transactions on Graphics, vol. 29, No. 3, Article 22, Jun. 1, 2010, pp. 1-12.

Official Communication issued in corresponding International Application PCT/EP2013/059674, mailed on Aug. 16, 2013.

Official Communication issued in corresponding Japanese Patent Application No. 2015-510824, mailed on Aug. 2, 2016.

Official Communication issued in corresponding Korean Patent Application No. 10-2014-7034270, mailed on Sep. 29, 2016.

* cited by examiner

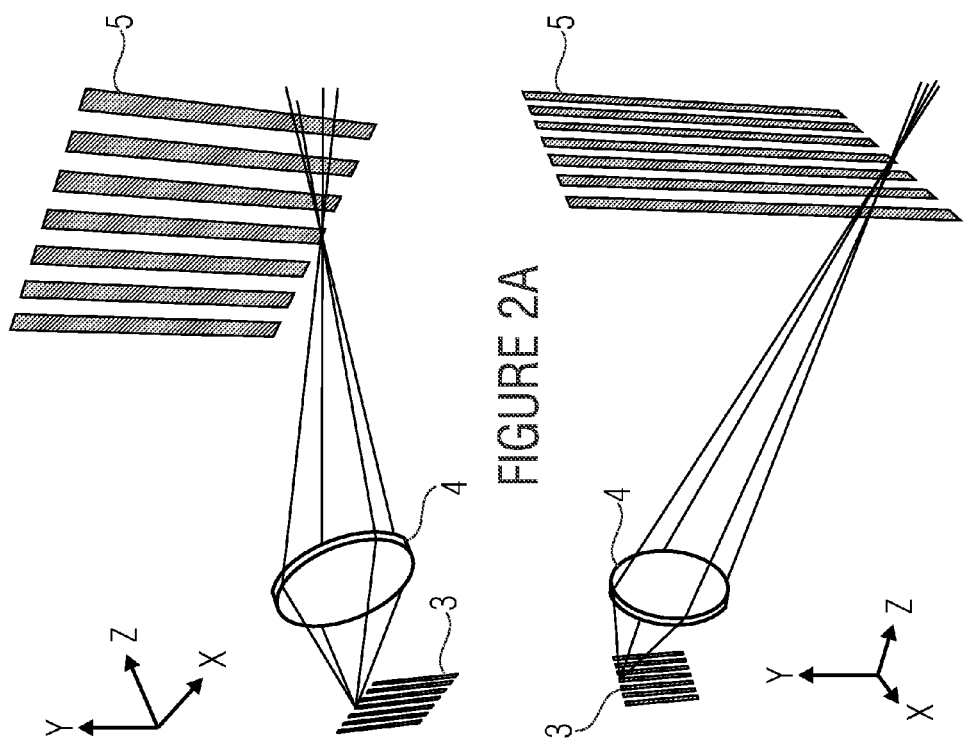
FIGURE 2A
FIGURE 2B
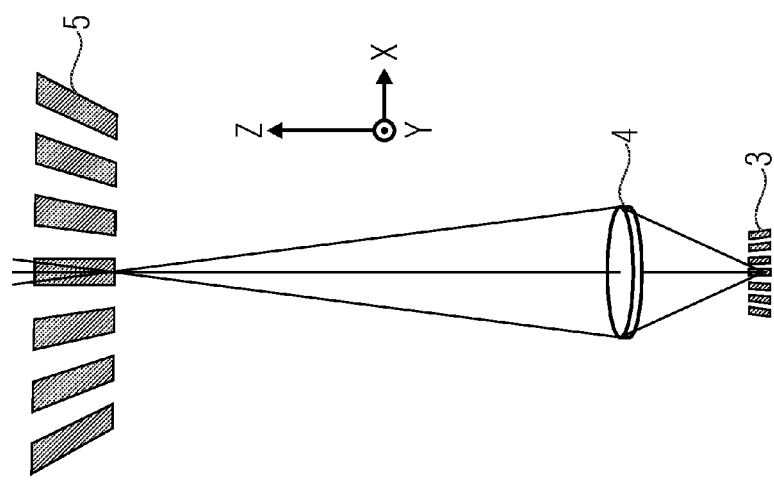
FIGURE 2C

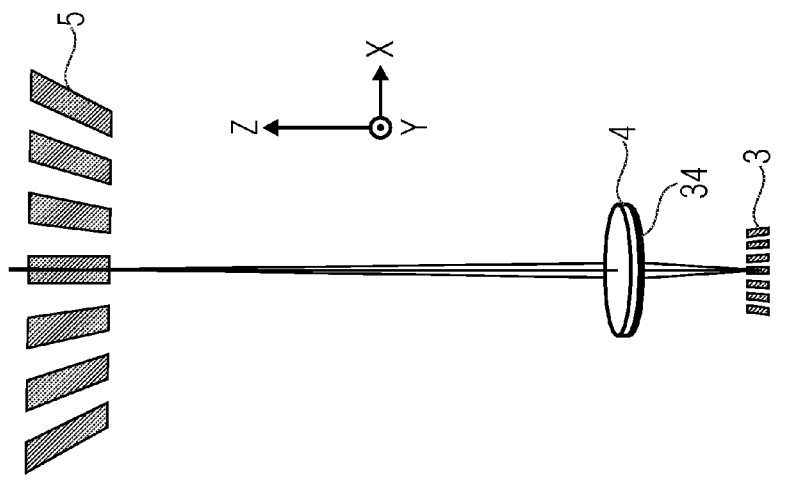
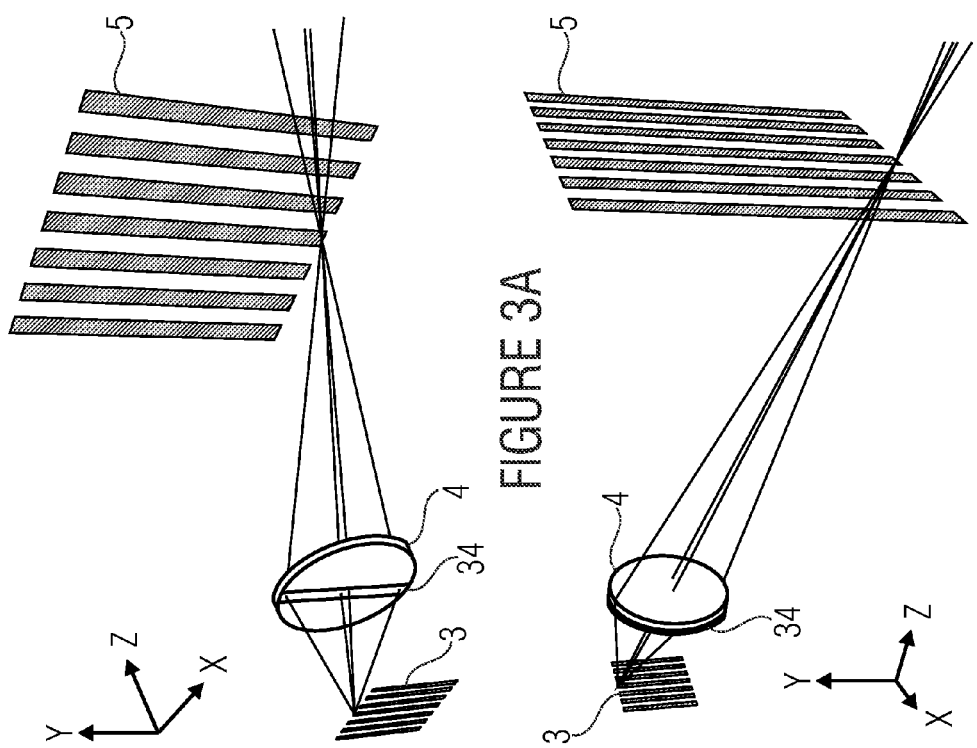

PROJECTION DISPLAY WITH MULTI-CHANNEL OPTICS WITH NON-CIRCULAR OVERALL APERTURE

CROSS-REFERENCE TO RELATED APPLICATIONS

This application is a continuation of copending International Application No. PCT/EP2013/059674, filed May 8, 2013, which is incorporated herein by reference in its entirety, and additionally claims priority from German Application No. 102012207621.2, filed May 8, 2012, which is also incorporated herein by reference in its entirety.

BACKGROUND OF THE INVENTION

Embodiments of the present invention relate to a projection display. Further embodiments of the present invention relate to a method for displaying an overall image. Further embodiments relate to a computer program for performing the method for displaying an overall image. Further embodiments of the present invention relate to an array for manipulating the mapping characteristics of a projection apparatus for different projection distances. Further embodiments of the present invention relate to a projection display having a non-circular and/or elongated overall aperture.

A projection display or projection system can be used to project an image or pattern onto a projection area, such as a screen or an object. Thereby, the image or pattern can be essential static, at least for a longer time span, as is known from a slide projector. Another type of a projection display is known as a video projector or digital projector and is able to project also dynamic images or image sequences. Projection displays or projection systems are also used in 3D measuring or surveying systems based on the principle of fringe projection or generally the projection of one or several known patterns onto an object to be measured.

In order to project the image or pattern in a focused manner onto the projection area, the projection area should be possibly at a distance from the projection display or system onto which the projection optics of the projection display is focused, or be at least within a tolerance range around this distance. This tolerance range is also referred to as a screen-sided depth of focus of the projector or projection display. In many projection displays, the focal length of the projection optics can be adjusted manually or automatically to the present or desired distance between projection display and projection area. However, it can be the case that the projection area is oblique to a projection direction predetermined by the projection optics, whereby the distance between the projection display and the projection area can change greatly within the image. For example, a bottom edge of the projected image can be at a much shorter distance to the projection display than a top edge of the same projected image. In a curved, discontinuous or stepped projection area, also, large distance variations can result within the projected image. Possibly, this distance variation can be greater than the screen-sided depth of focus which the projection display can obtain. In this case, even with optimum focusing of the projection optics, it has to be taken into account that individual areas of the projected image appear out of focus or blurred.

Greater depth of focus can typically be obtained by a higher f-number. However, a higher f-number also reduces the effective area available for light transmission. Thus, an increased f-number is typically accompanied by lower luminosity, which typically causes other problems, in particular when providing a sufficiently strong light source for the projection display.

With respect to a desired miniaturization of projection displays having sufficient luminosity, the usage of multi-channel optics has been suggested. DE 10 2009 024 894 describes a projection display having a light source and evenly spaced optical channels. By a slightly reduced pitch of the projection lenses with respect to the imaging structures, an offset of the respective imaging structure and the respective projection optics increasing from the array center towards the outside results, so that superposition of the real individual mappings at a finite distance results. Due to the separation into several channels, it is possible to reduce the distance between imaging structure and projection optics, i.e. the structural height, so that miniaturization is obtained together with other advantages. In the projection display described in DE 10 2009 024 894, the evenly arranged optical channel result, however, in a symmetrically designed overall aperture, which is why the depth of focus range is accordingly arranged symmetrically.

Depending on the field of application of the projection display, previous knowledge about the image(s) to be projected, or at least an image feature contained therein, already exists. In the case of fringe projection for 3D measuring of objects, for example, the orientation of the fringe patterns is known. This results in different requirements on the depth of focus to be obtained by the projection display for a first direction running, for example, essentially parallel to the fringes of the fringe pattern and a second direction running, for example, essentially orthogonally thereto.

SUMMARY

According to an embodiment, a projection display may have: an imager that is implemented to generate individual images in a distribution of sub-areas of an imaging plane of the imager; a multi-channel optics including channels, which is configured to map one allocated sub-area of the imager each per channel, such that the mappings of the individual images are combined to an overall image in a projection area, wherein the channels of the multi-channel optics are arranged in an elongated array oriented at least approximately like at least one elongated image feature of the overall image, so that a two-dimensional anisotropic out-of-focus behavior of each projected image point is obtained.

According to another embodiment, a method for displaying an overall image may have the steps of: generating individual images in a distribution of sub-areas of an imaging plane; mapping, by one channel of a multi-channel optics each, one allocated sub-area of the imaging plane each, such that the mappings of the individual images are combined to an overall image in an projection area, wherein the multi-channel optics includes channels that are arranged in an elongated array oriented at least approximately like at least one elongated image feature of the overall image, so that a two-dimensional anisotropic out-of-focus behavior of each projected image point is obtained.

Another embodiment may have a computer program having a program code for performing the inventive method for displaying an overall image when the computer program runs on a computer.

According to another embodiment, a projection system may have: a multi-channel optics including several optical channels and including at least one temporary anisotropic overall aperture with a main aperture axis and a secondary aperture axis orthogonal thereto; and a plurality of imagers, each allocated to one of the optical channels and configured to display one sub-image each, which is projected by means of the allocated optical channel, wherein the projected sub-images are combined to a projected overall image including a predominant edge direction; wherein the main aperture axis incorporates a smaller angle with the predominant edge direction than the secondary aperture axis.

According to another embodiment, a method for projecting an image may have the steps of: determining a predominant edge direction within the image; selecting a subset of imagers and a subset of respectively allocated optical channel within a multi-channel optics, wherein the imagers are configured to display one sub-image each, which is projected by means of the allocated optical channel, wherein the projected sub-images are combined to a projected overall image, wherein the selected subset of optical channels includes an at least temporary anisotropic overall aperture with a main aperture axis and a secondary aperture axis orthogonal thereto, and wherein the selection of the imagers and the respective optical channels is performed such that the main aperture axis incorporates a smaller angle with the predominant edge direction of the image than the secondary aperture axis.

Another embodiment may have a computer program having a program code for performing the inventive method for projecting an image when the computer program runs on a computer.

Embodiments of the present invention provide a projection display having an imager and multi-channel optics. The imager is implemented to generate individual images in a distribution of sub-areas of an imaging plane of the imager. The multi-channel optics comprises channels that are configured to map one allocated sub-area of the imager per channel each, such that the mappings of the individual images are combined to an overall image in a projection area. These channels of the multi-channel optics are arranged in an elongated array which is essentially oriented like at least one elongated image feature of the overall image. In this way, the multi-channel optics shows a two-dimensional anisotropic out-of-focus behavior of each projected image point or pixel.

Embodiments are based on the fact that it is possible to unite the requirements for high image brightness and sufficient depth of focus with a certain (previous) knowledge about the image or pattern to be projected (and the appropriate structure of the image itself). Thus, the previous knowledge about the image to be projected can be used to identify directions and/or areas within the image where the image changes only slightly or not at all. Along this/these direction(s), only a relatively low depth of focus has to be obtained, at least when it is acceptable that out-of-focus effects can occur in particular at the edge of the projected overall image. In a fringe pattern used for 3D measurement, for example, the fringes define such a direction, i.e. a relatively low depth of focus is typically sufficient in parallel to the fringes, since the image content does not change anyway, or only very slightly, along this direction. In contrast, this direction can be used within the overall image to provide a larger light transmission area resulting in higher projection brightness. In other words, an overall aperture of the multi-channel optics can be anisotropic within a plane that is orthogonal to a projection direction, and thus the multi-channel optics can have a greater overall aperture in a direction along the at least one image feature than orthogonal to the same. Anisotropy of the overall aperture or the out-of-focus behavior of the multi-channel optics can show itself in particular in the change of the mapping and/or the shape of a "blur" according to the sub-aperture array: with increasing deviation of the projection distance from the ideal projection distance, the blur increasingly assumes the shape of the sub-aperture array. The anisotropy of the out-of-focus behavior can be considered as a direction dependency for directions running within one plane that is orthogonal to the projection direction and/or the optical axis of the multi-channel optics. According to embodiments, this anisotropy of the overall aperture of the multi-channel optics is oriented according to a possible anisotropy of the image content, so that an overall aperture which is lower in one direction has no (visible and/or spurious) effect on a focused display of the image to be projected. This applies even when the projection distance varies greatly within the image to be projected, for example due to a projection area which is oblique or curved with respect to the projection direction. Since the individual channels of the multi-channel optics each have a relatively small individual aperture (according to a high screen-side f-number), every individual image itself is also mapped with a respectively high depth of focus, so that image contents changing obliquely or orthogonally to the above-mentioned anisotropy direction (for example the direction parallel to the fringes of a fringe pattern) of the image are projected with a large depth of focus range within every individual image. A large depth of focus range can be combined with relatively high projection brightness without having to suffer losses in the focused display of significant or important image features.

The image content of the image to be projected can include the at least one elongated image feature of the overall image. Such an image feature can, for example, be a bright-dark edge, a brightness gradient, a gray level gradient, a color gradient, etc. A longitudinal direction of the image feature can be defined by the fact that the image values (e.g. gray level values) vary only slightly in this direction. For example, the longitudinal direction of the image feature can be the direction where an integral of the gradient is minimal across the extension of the image feature. The elongated image feature does not necessarily have to be straight, but can also have a curved course. The elongated array of the multi-channel optics (or parts thereof) can map such a curved course either also as a curved array of several channels or can approximate the same by means of a straight channel array.

The multi-channel optics can comprise a first overall aperture in a first direction and a second overall aperture, which differs from the first overall aperture, in a second direction. The second direction is different to the first direction, i.e. the second direction is oblique or orthogonal to the first direction.

The channels of the multi-channel optics can form a two-dimensional array which has more channels in the longitudinal direction than in the transverse direction. The longitudinal direction corresponds to the elongated image feature or a direction deviating from this direction at the most by ±20 degrees, advantageously at the most by ±10 degrees and even more advantageously at the most by ±20 degrees. In this way, it can be particularly achieved that the multi-channel optics in the longitudinal direction comprises the above-mentioned larger artificial aperture in the direction along the at least one image feature.

The elongated array of the channels of the multi-channel optics can incorporate an angle between 80 and 100 degrees with a predominant intensity gradient direction of the overall image. The predominant intensity gradient direction can be determined, for example, based on an analysis of the overall image. It is possible, for example, for the intensity gradient to be determined at several positions of the overall image and the results to be averaged. The direction of the averaged intensity gradient is then the predominant intensity gradient direction. The intensity gradient can relate to a sub-area of the overall image (for example in the sense of a maximum gradient occurring within this sub-area) which is allocated to the channels of the multi-channel optics. The intensity gradient can relate to brightness values, gray levels, color intensities or other quantities common in image processing.

According to alternative embodiments, the mentioned channels of the multi-channel optics can be arranged in columns. Here, a number of columns can be smaller than a maximum occurring number of channels within a column.

The imager can be a static imager and the overall image can be predetermined, i.e. the overall image can be previously known, which can particularly be the case, for example, in applications for 3D measurement by means of fringe patterns. A passive imager, such as a shadow mask for example, can be used as a static imager. In alternative embodiments, a dynamic imager or active imager, such as a digital imager can be used. In order to utilize the options resulting from the anisotropic overall aperture of the multi-channel optics with regard to projection brightness and the depth of focus matched to the image content also for a dynamic imager, it can be envisaged that a preferential direction of the at least one image feature of the overall image is previously known or determined during operation (prior to projection). In some embodiments it can be sufficient when the direction is previously known or can be determined at least within a tolerance range (e.g. +/−5 degrees to 20 degrees). By knowing the preferential direction (e.g. the predominant edge direction), arrays of sub-areas of the imager (and possibly light sources allocated to these sub-areas), which are as similar as possible to this direction, can be specifically selected and used. In this case, the multi-channel optics can, for example, also comprise a square, circular or hexagonal array of individual channels which essentially has the same overall aperture in at least two directions. Within the multi-channel optics, by means of respective activation of respective sub-areas of the imager and possibly allocated light sources during the operation of the projection display, assemblies of at least some channels of the multi-channel optics can be activated which are arranged in the mentioned at least one elongated array that is similar to the at least one image feature of the overall image. Two examples are to illustrate this: a first image to be projected comprises an essentially perpendicular preferential direction, i.e. within a perpendicular fringe pattern. After determining the preferential direction, sub-areas of the imager and/or possibly allocated light sources are activated, which together result in an essentially perpendicular array (wherein the direction "perpendicular" relates to the perception of a viewer of the projected overall image). In contrast, a second image to be projected has an essentially horizontal direction, for example in the form of a horizontal fringe pattern. After determining this horizontal preferential direction, other sub-areas of the imager and/or possibly allocated light sources can be activated, which together result in an essentially horizontal array. According to some embodiments, the imager and the multi-channel optics can comprise, for example, cross-shaped or T-shaped assemblies of sub-areas or channels, wherein in an essentially perpendicular preferential direction, the sub-areas or channels in the perpendicular bar of the cross are used, and in an essentially horizontal preferential direction, the sub-areas or channels in the horizontal bar are used. However, part of the sub-areas of the imager or the channels of the multi-channel optics remains unused and can thus not contribute to image brightness; however the image brightness is higher than when using only one sub-area/channel and simultaneously the depth of focus is higher than when using all sub-areas/channels, at least in the direction where a depth of focus that is as high as possible is necessitated.

As mentioned, the imager can comprise a distribution of sub-areas by which respective individual images can be generated. Since each channel of the multi-channel optics is typically allocated to one of the sub-areas of the imager, the sub-areas of the imager can also be arranged in an elongated array which is similar to the at least one elongated image feature of the overall image. In this way, the imager can also have some type of direction-dependent artificial aperture (overall aperture), similar to the multi-channel optics.

In some embodiments, the multi-channel optics can comprise a one-dimensional array of projection optics in a projection plane essentially parallel to the imaging plane. The projection optics array can be configured to map one allocated individual image of the imager each along a respective optical axis in the direction of the projection area, such that the mappings of the individual images are superposed to the overall image in the projection area. This superposition of the mappings of the individual images is hence a special case of combining the mappings of the individual images to the overall image. In alternative embodiments, mixed forms are also possible, such that partial superposition of the mappings of the individual images results, i.e. overlapping of the mappings of the individual images.

The channels of the multi-channel optics can form a two-dimensional array comprising one or several areas with respective envelopes of the channels, wherein the area or the areas are similar to the at least one image feature. The area or the areas can be contiguous areas. Alternatively, it can also be provided that two or more areas are arranged alternatingly.

Compared to the overall aperture of the entire multi-channel optics, the channels of the multi-channel optics can have a small sub-aperture and a high depth of focus, so that the mappings of the individual images considered individually are focused across a comparatively large range (compared to the projection of the overall image) of a distance between the multi-channel optics and the projection area. The channels of the multi-channel optics can show a hyperfocal behavior.

At least some of the channels of the multi-channel optics can be arranged in a symbol-like sub-aperture array in order to obtain a symbol-like out-of-focus behavior for varying projection distances, which corresponds to the symbol-like sub-aperture array. With increasing deviation of the projection distance from the ideal projection distance, the out-of-focus behavior of the multi-channel optics increases, so that the overall image is only superposed in an unfocused manner, the mappings of the individual images, however, increasingly form a symbol on the projection area which corresponds to the symbol-like sub-aperture array. For example, the sub-areas of the imager can be configured to project a word or lettering. The sub-aperture array can be symbolically designed in the form of a logo or graphical sign. When the projection area is at the ideal projection distance or at least within the depth of focus range of the multi-channel optics, the word or lettering is projected onto the projection area. If, however, the projection area is moved closer towards the projection display, the word/the lettering in the form of the logo/graphical sign blurs. If the projection area is moved further away from the projection display, starting from the ideal projection distance or the depth of focus range, the word/the writing also blurs and a dotted pattern corresponding to the shape of the symbol-like sub-aperture array occurs on the projection area.

The multichannel optics can comprise a one-dimensional channel array, a concentric channel array, a square channel array, a hexagonal channel array or a stochastic channel array.

Within the multi-channel optics, each of the channels can comprise a projection optics including, for example, a field lens and a projection lens. The field lens is arranged, for example, between a light source and the imager. The projection lens is arranged, for example, between the imager and the projection area. In other words, each channel comprises a field lens placed in front of the respective sub-area of the imager in the transmission direction, and a projection lens placed behind the respective sub-area in the transmission direction. The projection optics of the multi-channel optics of the projection display can show a decentration with respect to the allocated sub-areas of the imager, so that the overall image superposed in the projection area is real or virtual. Due to the decentration or central compression or extension between the projection optics and the allocated sub-areas of the imager, in particular a projection distance of the overall image in the projection area can be adjusted.

The multi-channel optics can further comprise a downstream overall lens cooperating with the projection optics of the individual channels that is implemented to refocus collimated beams from the projection optics.

In further embodiments of the present invention, the downstream overall lens can be implemented as optics having variable focal lengths, so that an average projection distance is adjustable.

Further embodiments provide a projection system having multi-channel optics including several optical channels. The multi-channel optics comprises an at least temporarily anisotropic overall aperture having a main aperture axis and a secondary aperture axis orthogonal to the same. Further, the projection system comprises a plurality of imagers each allocated to one of the optical channels and configured to display one sub-image each, which is projected by means of the allocated optical channel. The projected sub-images are combined to a projected overall image comprising a predominant edge direction. The main aperture axis encloses a smaller angle with the predominant edge direction than the secondary aperture axis.

The overall aperture of the multi-channel optics can be permanently anisotropic or merely temporarily anisotropic. The temporary anisotropy can, for example, take place by deactivating individual optical channels, so that the remaining active optical channels have an elongated array. Such an elongated array has a greater extension into a spatial direction (normally referred to as longitudinal direction) than into other directions (e.g. in a direction normally referred to as transverse direction). The overall aperture is normally spanned in a plane which is orthogonal to the optical axis/axes of the multi-channel optics. The at least temporary anisotropy of the overall aperture of the multi-channel optics causes an anisotropic out-of-focus behavior. The at least temporary anisotropic overall aperture and the overall image to be projected can be oriented to one another for an improved focus behavior of the projection system, such that ideally the main aperture axis runs parallel to the predominant edge direction. Apart from the already mentioned selective deactivating and activating individual optical channels of the multi-channel optics or the individual allocated images, the overall projection system (or also only part of the same) can also be rotated around the optical axis. Normally, a compensating rotation of the image content of the overall image to be projected is also to be performed, as long as the overall image is to be projected in the normal orientation. In some embodiments, the main aperture axis cannot be rotated in a continuous manner but only in discrete steps. In these cases, improving the focus behavior of the projection system can also be achieved in that the main aperture axis comprises a smallest possible angle (in any case smaller than the angle between the predominant edge direction and the secondary aperture axis) with the predominant edge direction. The principle of main axis and secondary axis is known, for example, in the context of the description of ellipses.

The predominant edge direction results from the image content to be displayed. In particular, the predominant edge direction can be previously known (e.g. in the case of a fringe pattern as is used for the purposes of 3D measurement), can be determined by arithmetic averaging across the overall image content or an image section, by geometric averaging, by evaluating a gradient histogram or by other statistical evaluations. The image content transmits information evaluated and used for obtaining a technical effect, namely in particular improving the (subjective) focus behavior of the projection system, while simultaneously maintaining the desired illumination intensity or the like (or at least without having to accept serious losses in illumination intensity or the like). In other words, the suggested projection system is able to transform the blur perceived by a viewer of the projected overall image such that it is perceived less strongly in the context of the displayed image content. This effect can be compared to the effect of perceptual audio coding where portions of an audio signal that are not perceived by humans anyway are considered less or not at all during encoding and hence disappear within the noise floor. The term "edge direction" or "predominant edge direction" is not limited to edges (e.g. light-dark edges or color edges) but can also relate to moving or gradual color transitions. However, blur is typically perceived most strongly at sudden edges and corners, so that weighting in favor of hard edges can be provided.

BRIEF DESCRIPTION OF THE DRAWINGS

Embodiments of the present invention will be detailed subsequently referring to the appended drawings, in which:

FIGS. 2A-2C are different schematic perspective views of a classical single-aperture projector with an enlarged mapping of a line grating;

FIGS. 3A-3C are different schematic perspective views of a classical single-aperture projector having adapted exit pupils for increasing the depth of focus for structures having an orientation in parallel to the y-axis;

DETAILED DESCRIPTION OF THE INVENTION

Before the present invention will be discussed in more detail below based on the figures, it should be noted that in the following embodiments the same elements or functionally equal elements are provided with the same reference numbers in the figures. Thus, a description of elements having the same reference numbers is inter-exchangeable and/or can be used in different embodiments.

The embodiments described below relate to the manipulation (e.g. increasing the depth of focus) with high requirements with respect to system compactness and projected light flux.

Figure 1:
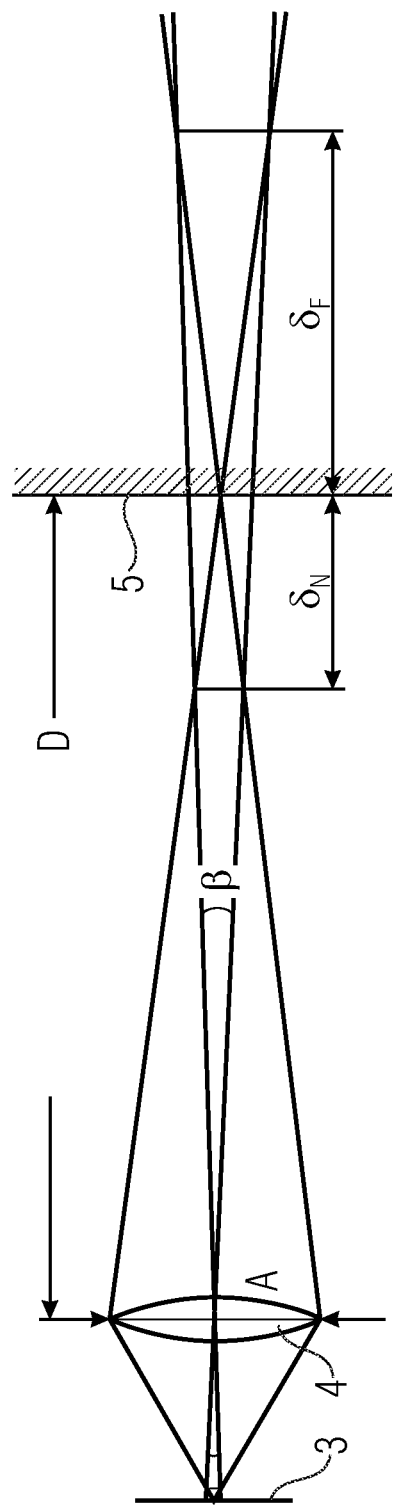
FIG. 1 is a schematic side view of an optical system for deriving the depth of focus of a classical single-aperture projector.

The screen-side depth of focus of a projector results according to geometrical considerations from the projection distance D, the pupil extension A and the acceptable out-of-focus angle β according to FIG. 1 by the following relation $$\delta_{N,F} = \frac{D^2 \beta}{(A \pm D\beta)} \quad (1)$$

(from "Modern Optical Engineering" by W. J. Smith, McGraw-Hill, 2007). FIG. 1 shows a 2D layout for deriving the depth of focus of a classical single-aperture projector. Light beams are emitted by an imager 3 (e.g. a slide or a structured mask) in the direction of a projection lens 4. The light originates either from a light source not shown in FIG. 1 or from the imager 3 itself. When the light originates from a light source, the same can either be arranged at the left of the imager 3, in which case the imager is irradiated by the light emitted from the light source. Alternatively, the light source can also be arranged at the right of the imager, in which case the imager 3 operates, for example, as a reflecting imager. The projection lens 4 focuses the light emitted by the imager 3 onto a projection area which is at a distance D from the projection lens. According to FIG. 1 and formula (1), the depth of focus range is divided into a near depth of focus range $\delta_n$ and a far depth of focus range $\delta_f$ and thus extends from D–$\delta_n$ to D+$\delta_f$. When considering the relation (1) in more detail, it can be seen that the pupil extension A, also referred to as "aperture", is in the denominator, which shows that a greater pupil extension results in a lower depth of focus. However, the pupil extension A also has an influence on the amount of light that can be projected by the projector: the smaller the pupil extension is made in favor of a higher depth of focus, the less light can pass through the pupil, which again results in a darker projected image.

The above-stated requirements can be fulfilled, for example, by a classical single-aperture projector. FIGS. 2A, 2B and 2C represent such a classical single-aperture projector in different perspective views, which presents, due to its optical structure, a trade-off between compactness (minimum focal length) and transmittable light flux (slide area) (see "Meeting the Challenges of Developing LED-based Projection Display", by E. Geissler, Proc. SPIE 6196, 616901-616912 (2007)). FIGS. 2A to 2C show such a classical projection system for magnified mapping of a line pattern onto the projection area, whose one-dimensional structures run parallel to the y-axis. Due to the circular exit pupil of the projection lens 4, the depth of focus in the x-direction corresponds to that in the y-direction, according to the above-stated relation (1).

Increasing the depth of focus in a preferential direction (in the example: x-direction) can be achieved by narrowing or constraining the exit pupil of the projection optics (aperture A in FIG. 1). This can be realized by a mechanical aperture or by asymmetrical illumination of the pupil. FIGS. 3A, 3B and 3C show different schematic perspective views of the system of FIGS. 2A-2C with a greatly narrowed pupil 34 in the x-direction. In particular, FIGS. 3A-3C show a classical single-aperture projector having an adapted exit pupil for increasing the depth of focus for structures having an orientation in parallel to the y-axis. By this array, the depth of focus in the x-direction is significantly increased with respect to the depth of focus in the y-direction when changing the screen distance in the z-direction. When varying the screen distance without refocusing, blurring occurs in particular in the y-direction, while focus or contrast along the x-axis is mostly maintained. Some slit lamps for ophthalmological examinations, for example, have such an array. Illumination optics according to Köhler generates a mapping of the light source within the pupil of the projection optics. The projections optics maps an upstream slit-shaped aperture onto the eye of the patient. In some systems, the filament of the light source is advantageously oriented in parallel to the slit orientation in order to illuminate the pupil of the projection optics with the highly asymmetrical mapping of the filament. The line shape of the light source thus generates a highly asymmetrical illumination of the pupil. Thus, the depth of focus of the projected line is increased perpendicular to its orientation. The projected slit is diffused for different distances, especially along its extension direction. This allows the mapping of a focused line across an increased operating range during an eye examination.

A further example is the so-called Scheiner or Hartmann aperture; the same is placed directly within the pupil of the mapping optics and serves as an auxiliary means for adjusting optical devices. The Scheiner aperture manipulates the depth of focus of the optical device such that the collimated beams of an object point are merely superimposed to a point image when the same are focused correctly. When the same are misaligned, the mappings drift apart again according to the predetermined pupil shape. The depth of focus artificially lowered or manipulated in this way eases the alignment of optical structures, e.g. telescopes.

Figure 4:
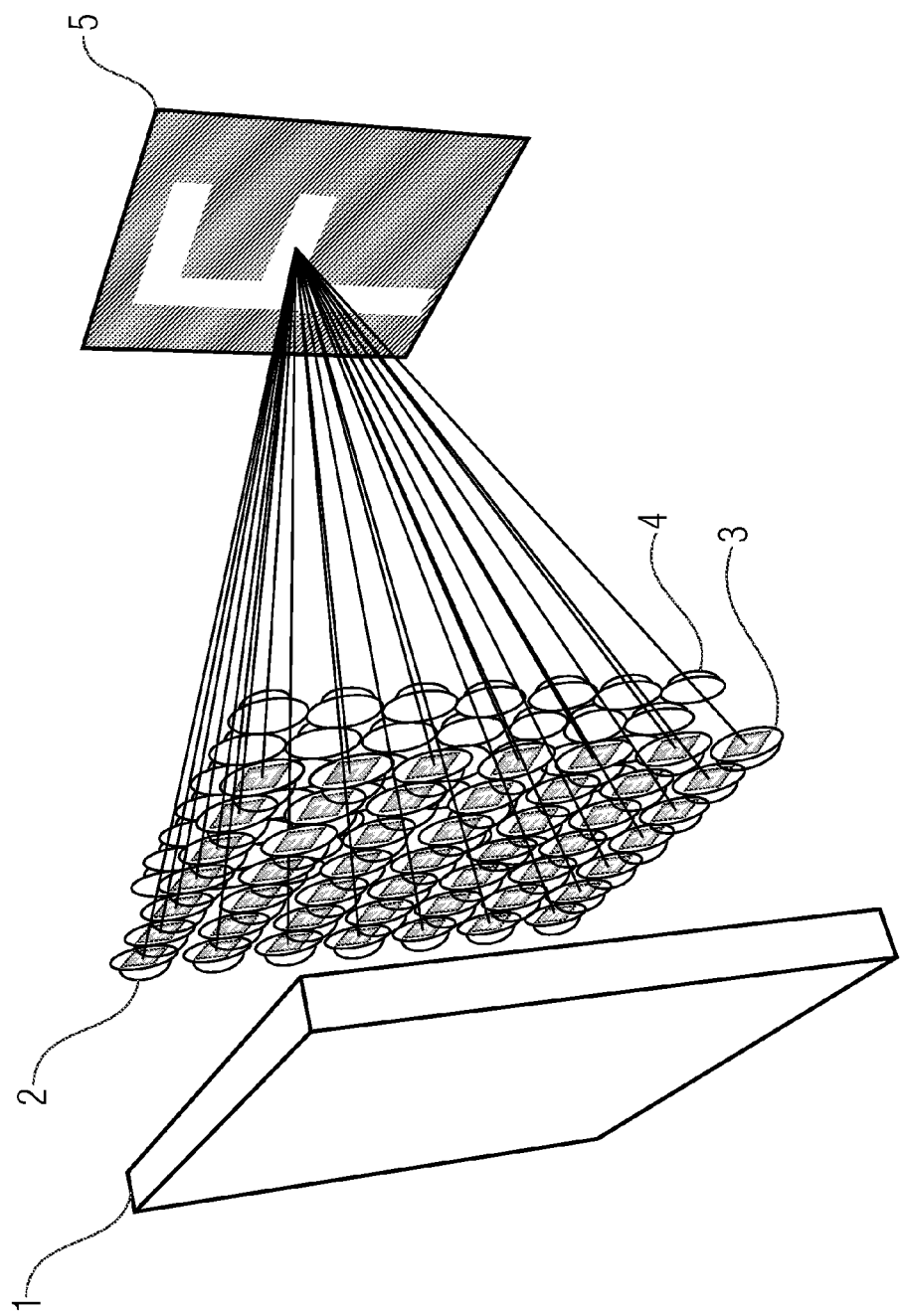
FIG. 4 is a schematic perspective view of an array projector with evenly arranged projection channels.

Another variation is a multi-aperture array of micro-projectors (array projection) described in detail, for example, in the German patent application DE 10 2009 024 894 A1 and an article by M. Sieler, P. Schreiber, P. Dannberg, A. Brauer and A. Tünnermann entitled "Ultraslim fixed pattern projectors with inherent homogenization of illumination", Appl. Opt. 51, 64-74 (2012). This multi-aperture approach allows decoupling of the system structure length of the projection system from the transmitted flux (light flux) allowing compact and at the same time bright projection systems. An even, two-dimensional array of the sub-apertures within the projector array is described, wherein the depth of focus of the overall extension is determined by the overall extension of the array. FIG. 4 shows a schematic perspective view of an array projector having evenly arranged projection channels. An array of 7×7 tightly packed individual projectors in squares having area backlighting by a light source 1 is shown exemplarily. Each of the individual projectors includes a field lens 2, an imaging element (e.g. a slide, a structured mask, an LCD element or, more generally, a sub-area of an imager) and a projection lens 4.

In the approach shown in FIG. 4, the allowable projection distance is limited to a relatively narrow range, since the superposition of the mappings of the individual images projected by the different single projectors of the array projector works in the intended manner only for this distance range. During a deviation from the ideal projection distance, the individual mappings are no longer superimposed congruently, so that the overall image appears out of focus, although each individual mapping of an individual image is individually projected with great focus.

Embodiments describe the array of the sub-apertures or their envelopes within an array projector in such a way that a manipulation (e.g. increase in the depth of focus) of the general mapping characteristics can take place when defocusing a projection system.

In some embodiments, the shape of the overall pupil or envelope of the sub-apertures is adapted to the image or pattern to be projected. In some of these embodiments, an increase of the depth of focus for projecting one-dimensional structures can be obtained in this way. In another subgroup within these embodiments, an array of the sub-apertures can be provided in the form of a pattern.

Figures 5A, 5B:
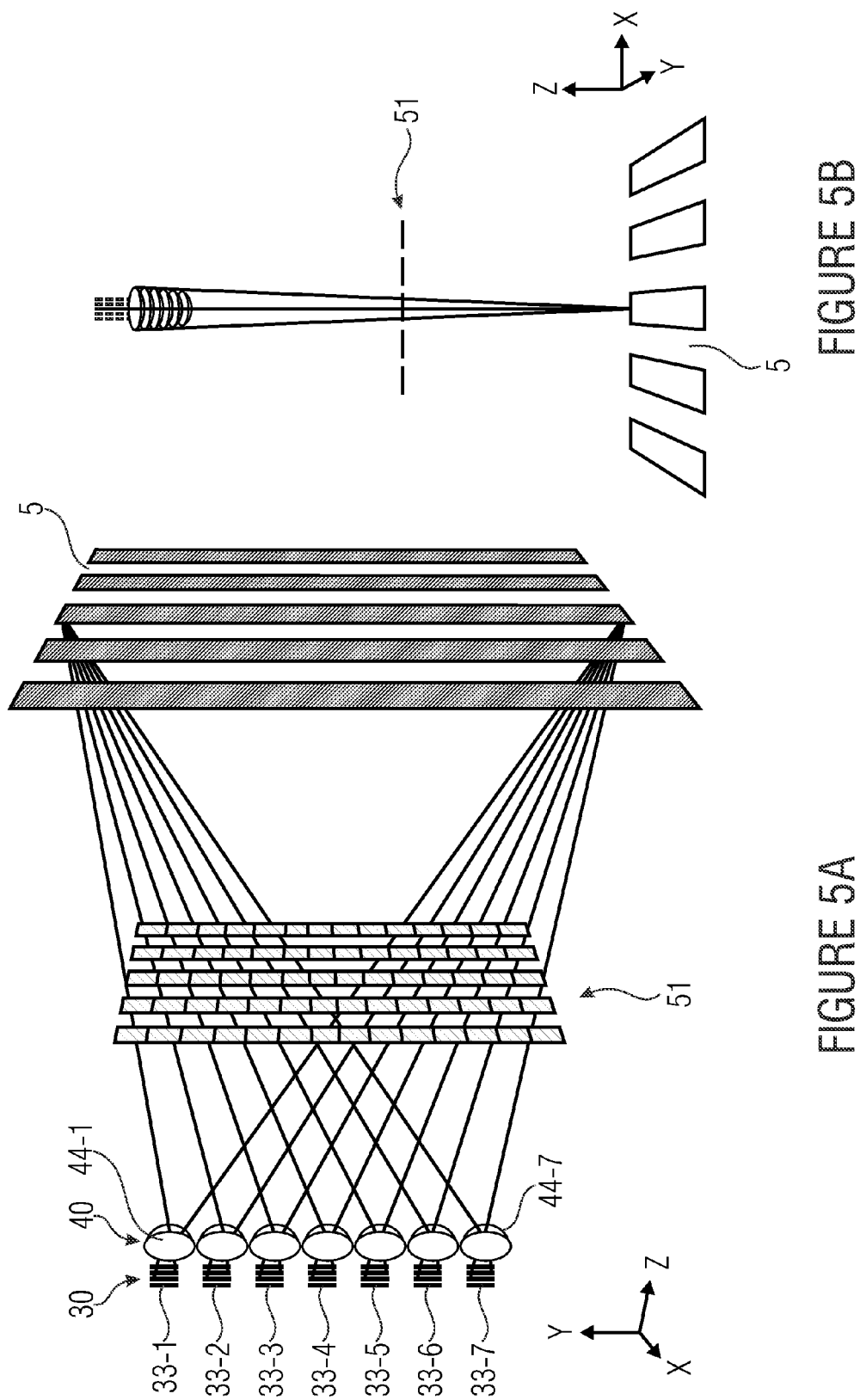
FIGS. 5A-5B are different schematic perspective views of an array projector for lens projection according to embodiments.

Exemplarily, based on FIGS. 5A and 5B, first, increasing the depth of focus by column-wise arranged projection channels is illustrated, i.e. increasing the depth of focus for projecting one-dimensional structures. By forming a highly asymmetrical overall pupil, e.g. in the shape of an ellipse, a rectangle or a line (e.g. having a side ratio of x:y=1:7), blurring of the projected pattern in the y-direction mainly occurs when shifting the screen along the z-axis. During the projection of a line grating whose lines are oriented in parallel to the y-axis, blurring of the image occurs mainly in parallel to the fringe pattern when varying the screen distance along the z-axis. The contrast orthogonal to the grid pattern is maintained across a significantly greater depth of focus range (distance range). Due to the short focal lengths within the individual channels, the multi-aperture array allows short projection optics and the area array ensures the transmission of a large light flux at the same time. Thus, the pupil is advantageously extended in the direction of the structure.

The projection display illustrated in FIGS. 5A and 5B comprises an imager 30 and a multi-channel optics 40. In the illustrated example, the imager 30 comprises seven sub-areas 33-1 to 33-7. The sub-areas 33-1 to 33-7 are arranged as a one-dimensional array in an image plane of the imager 30. Each of the sub-areas 33-1 to 33-7 comprises a structure which provides, during operation of the projection display, the light passing through the imager 30 or reflected by the same with a respective pattern. The respective structures of the sub-areas 33-1 to 33-7 can be configured as static (e.g. invariable) structures, such as chrome masks on glass substrates.

In particular in projection displays that can be used for 3D measurement by means of fringe patterns, the fringe pattern can be implemented as a static structure in the respective sub-areas of the imager. The fringe pattern can, for example, be a trigonometric pattern, i.e. a gray level gradient or brightness gradient varying according to a trigonometric function which is reproduced, for example, by means of a fine binary line pattern. The static structures implemented in the respective sub-areas can have an orientation which runs in parallel or essentially in parallel to the direction of the largest overall aperture of the multi-channel optics. In this way, the overall aperture of the multi-channel optics and the overall image generated by the static structures of the imager are adjusted to each other, whereby the depth of focus is different for different image directions within the overall image and is hence adapted to the requirements for a focused display of the image structures.

In alternative embodiments, sub-areas 33-1 to 33-7 can be configurable or controllable during operation, so that different patterns can be generated by a sub-area at different times (dynamically). For this purpose, different technologies can be used, e.g. LCD (liquid crystal display), LCOS (liquid crystal on silicon) or DMD (digital micromirror device). Depending on the technology used, the light used for the projection can pass through the sub-areas of the imager 30 or can be reflected by the same. An individual chip can be provided for each sub-area 33-1 to 33-7, or several or all sub-areas 33-1 to 33-7 can be integrated on one chip.

The multi-channel optics 40 comprises seven optical channels 44-1 to 44-7 schematically represented in FIGS. 5A and 5B by the respective projection lenses. Each of the optical channels 44-1 to 44-7 is allocated to one of the sub-areas 33-1 to 33-7 of the imager 30 to map the same. The mappings of the individual images of the respective sub-areas of the imager 30 are combined to an overall image 5 in or on a projection area. This combination of the mappings of the individual images can be a superposition, a "tiled" array or a partial overlapping of the mappings of the individual images. In FIGS. 5A and 5B, the overall image 5 is displayed as a perpendicular fringe pattern projected onto a projection area. In the displayed example, the overall image 5 is generated by a superposition of the mappings of the individual images. In comparison, FIGS. 5A and 5B also show a second overall image 51 which would result due to a superposition of the mappings of the individual images at a lower projection distance. Based on the second overall image 51, it can be seen that the fringe pattern can be projected with sufficient focus, even at a much shorter projection distance.

In the embodiment shown in FIGS. 5A and 5B, the channels of the multi-channel optics are arranged in an elongated array, wherein the elongated array is straight. As can be seen in the projected overall image 5, the fringe pattern comprises a plurality of elongated image features extending in parallel to the y-direction (in the following also referred to as "perpendicular" direction). Elongated image features can, for example, be the five black perpendicular bars of the fringe pattern. Alternatively, it is also possible to consider a light-dark transition as an elongated image feature. It can be seen in FIGS. 5A and 5B that the elongated array formed by the channels of the multi-channel optics 40 is, as regards to its orientation, similar to the elongated perpendicular image features contained in the fringe pattern 5. Thus, in the y-direction, i.e. along the at least one elongated image feature, the multi-channel optics 40 comprises a larger artificial aperture than orthogonal to the same, i.e. here in particular in the x-direction. In this way, due to the relatively large aperture in the y-direction, relatively large blurring results in the y-direction. However, since the elongated image features of the fringe pattern 5 also extend in the y-direction, this blurring in the y-direction is not perceivable for a viewer of the overall image 5, or at least almost not perceivable. The overall image 5 is diffused along the image features, whereby merely already highly similar or even identical image areas are superimposed. Since the fringe pattern 5 has a greater proportion of higher spatial frequencies in the x-direction compared to the y-direction (i.e. that the overall image 5 varies more in the x-direction than in the y-direction), blurring in the x-direction is to remain as small as possible so that these details of the overall image 5 can be projected onto the projection area with sufficient focus. This is ensured by the projection display in that the overall aperture of the multi-channel optics 40 is much smaller in the x-direction than the overall aperture in the y-direction. In particular, the overall aperture in the x-direction corresponds to the aperture of an optical channel, since the elongated array is single-column. In the illustrated embodiment, the multi-channel optics 40 has, however, a seven times larger area available for the light flux to be projected than a single channel 44-1 to 44-7. Thus, a much brighter overall image 5 than with only one channel can be projected. At the same time, compared to a single channel, the optical mapping characteristics of the multi-channel optics are changed by the aperture increase accompanying the area increase only for the direction within the overall image 5, where a resulting greater blurring only has an insignificant effect.

Due to the fact that the multi-channel optics 40, with respect to the array of its individual channels, is adapted or can be adapted to one or several image features of the overall image 5 to be projected, it is possible to combine the requirements for projection brightness which is as great as possible (i.e. an aperture as large as possible) and for great depth of focus (i.e. an aperture as small as possible) with one another such that in a first image direction more emphasis is placed on the great projection brightness and in the second image direction more emphasis is placed on the great depth of focus. A an alternative to the above description of the multi-channel optics 40, the same could also be described to the effect that the multi-channel optics 40 comprises different overall apertures in two directions orthogonal to the projection direction, wherein the larger overall aperture incorporates an angle of maximally 20 degrees, advantageously maximally 10 degrees, or further advantageously maximally 5 degrees with an image axis of the lowest image dynamics of the overall image 5.

With respect to the array of sub-apertures in the form of a pattern, the same can be arranged within an array in such a shape that their envelope results in a defined shape, a symbol, a text or the like. Thus, this shape can be perceived by the viewer when viewing the projection display directly with the eye or on a screen in the near field. Compared to classical systems having one (single) mapping channel, this characteristic can be realized without efficiency losses in combination with array illumination.

FIGS. 7A, 7B and 7C show different perspective views of a projection display having multi-channel optics arranged in a symbol-like manner whose out-of-focus behavior varies in dependence on the projection distance.

The multi-channel optics 40 comprises a symbol-like sub-aperture array which is shaped like the letter "F" in the example illustrated. The imager 30 also comprises this symbol-like array. In the present case, the multi-channel optics 40 comprises thirty channels. Accordingly, the imager 30 comprises thirty sub-areas.

If the projection area is at a distance from the projection display, which is within the depth of focus range of the multi-channel optics 40 around the ideal projection distance, the overall image 5 will be projected onto the projection area which is determined by the imager 30. The mappings of the individual images are superimposed on the projection area within the depth of focus range, such that image points of the individual images belonging to one another are essentially projected onto the same location of the projection area. In this way, the overall image 5 defined by the imager 30 is projected in a focused manner onto the projection area. As a representative for other image points, FIGS. 6A to 6C each show one central image point together with allocated light beam. It can be seen that these central image points are projected into the center of the overall image 5 when the projection area is at the ideal projection distance.

Figure 6A:
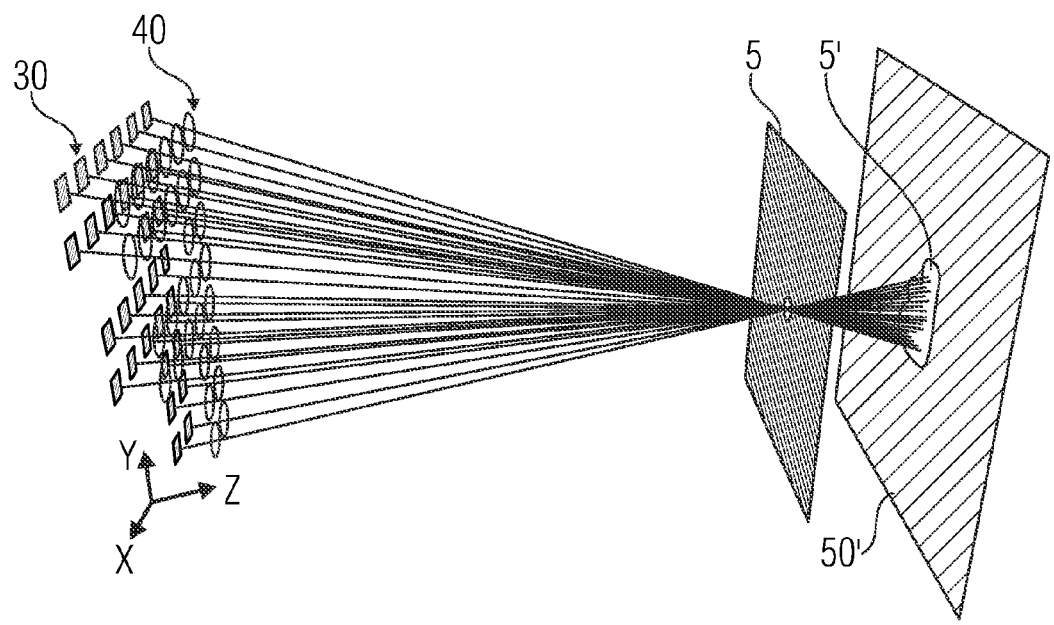
FIGS. 6A-6C are different perspective illustrations of an out-of-focus behavior of a projection display varying in dependence on the projection distance, wherein the multi-channel optics comprises a symbol-like sub-aperture array or array.
Figure 6B:
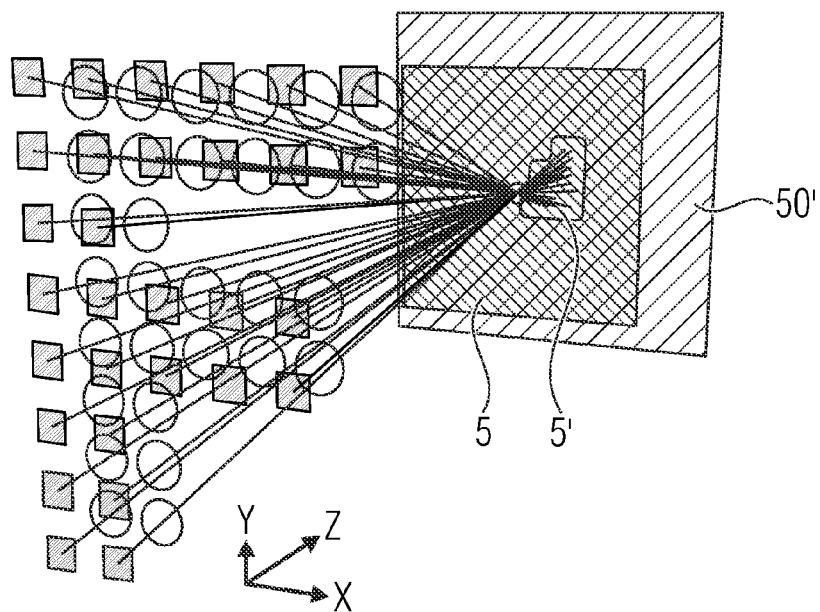
Figure 6C:
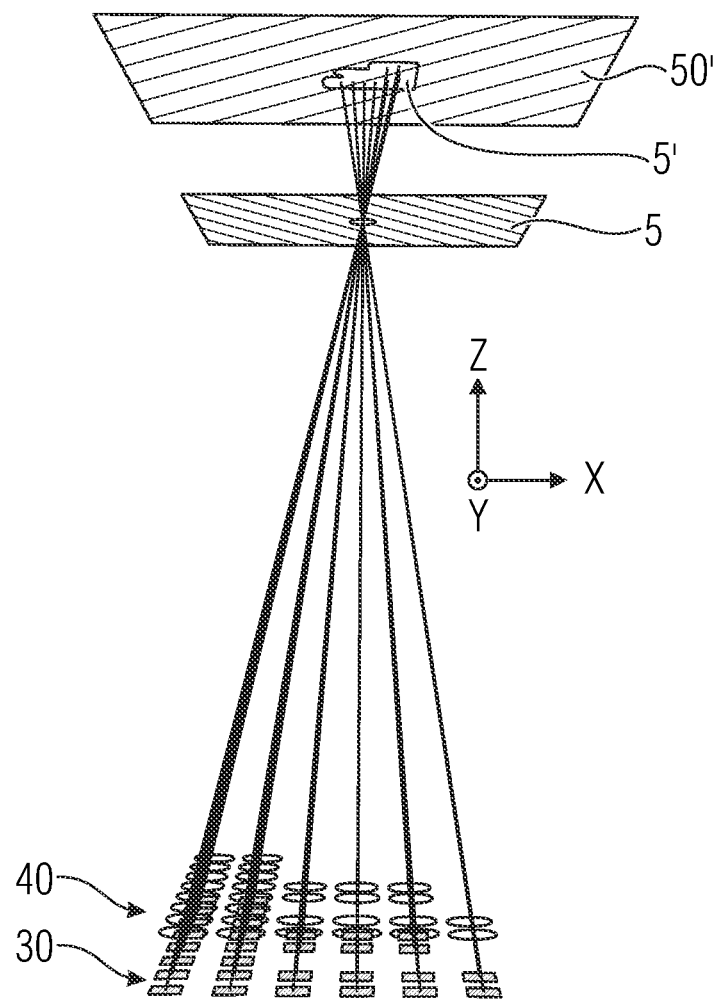

FIGS. 6A to 6C also show an exemplary second projection area 50' which is further away from the projection display than the ideal projection distance. The beams emanating from the central image points fan out again, which results in an unfocused mapping of the overall image when the overall image is projected onto the second projection area. Fanning out of the beams, however, also follows the symbol-like sub-aperture array, such that the plurality of central image points forms the letter "F" on the second projection area 50', which is, however, rotated by 180° with respect to the array of the channels of the multi-channel optics 40 due to the optical paths. In the distance illustrated in FIGS. 6A to 6C, there is still partial overlapping of the mappings of the individual images. If the second projection area 50' were even further away from the projection display, the mappings of the individual images projected by individual channels would no longer partly overlap but drift further and further apart, wherein, however, they maintain the "F" shape of the symbol-like sub-aperture array in their entirety. Mappings of the individual images can remain focused across a wide range of the projection distance, since the individual channels can have a large depth of focus range.

If the second projection area 50' is closer to the projection display than the ideal projection distance, likewise the symbol in the form of an "F" predetermined by the symbol-like array of channels will be projected, which can be seen particularly in FIG. 6B from the optical path of the different beams.

The multi-channel optics can comprise a one-dimensional channel array, a concentric channel array, a square channel array, a hexagonal channel array or a stochastic channel array.

Figure 7:
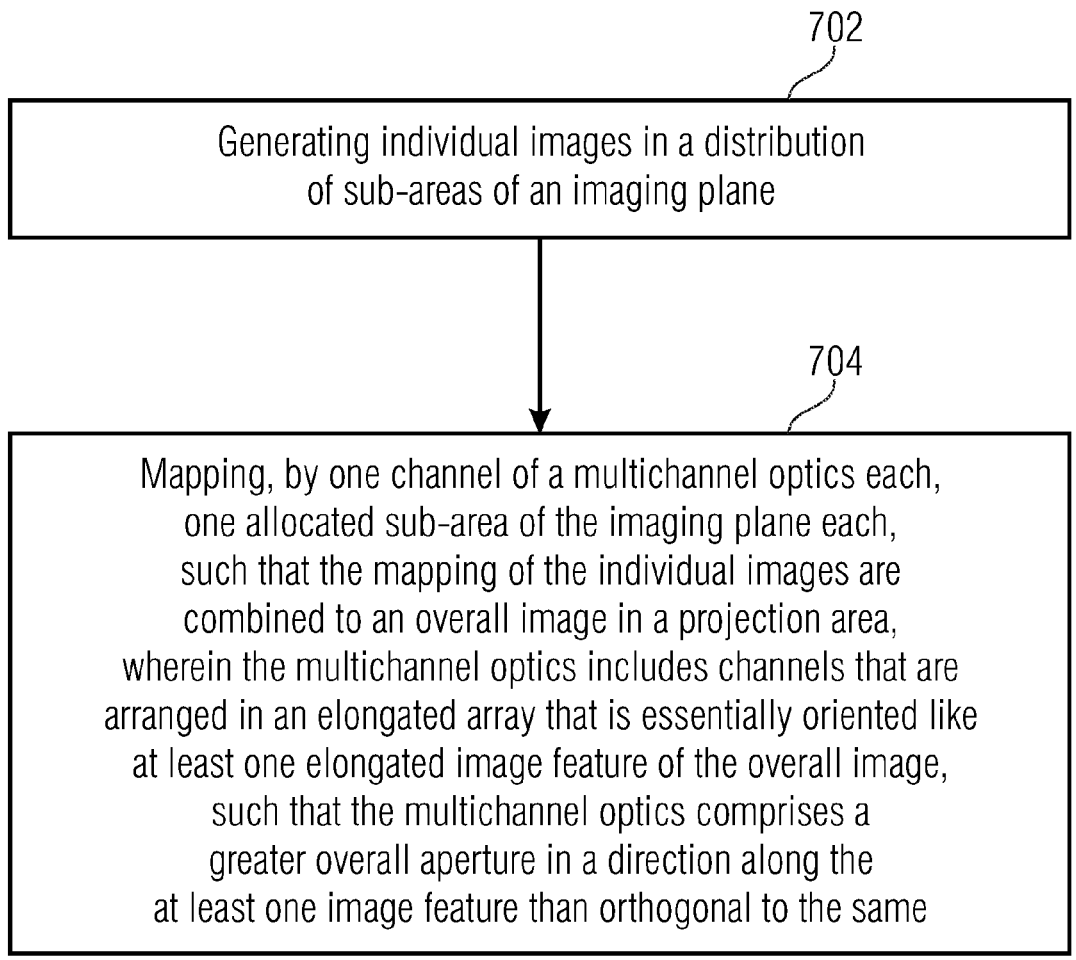
FIG. 7 is a schematic flow diagram of a method for displaying an overall image according to embodiments.

FIG. 7 shows a schematic flow diagram of a method for displaying an overall image according to embodiments. The method comprises a step 702 of generating individual images in a distribution of sub-areas of an imaging plane. Generating the individual images can be carried out statically, i.e. by illuminating a static imager (e.g. a chrome mask). Alternatively, generating the individual images can be carried out dynamically, for example by means of respective optical actuators, e.g. based on LCD, LCoS or DMD technology.

In embodiments, generating the individual images can be performed in dependence on a smallest distance and a greatest distance between the multi-channel optics and the projection area. In this way, the necessitated depth of focus range can be considered when generating the individual images, for example by determining a position or scaling of the individual images in dependence on the smallest and the greatest distance. This measure can have the effect that a desired (constructive or destructive) superposition of the mappings of the individual images on the projection surface results.

Further, the method for displaying an overall image comprises a step 704, during which the sub-areas of the imaging plane are mapped, one sub-area each by one allocated channel of a multi-channel optics each. Mapping the allocated sub-areas of the imaging plane is performed such that the mappings of the individual are combined to an overall image in or on the projection area. At least some channels of the multi-channel optics are arranged in an elongated array which is essentially oriented like at least one elongated image feature of the overall image, so that the multi-channel optics has a larger artificial aperture or overall aperture in a direction along the at least one image feature than orthogonal to the same.

In embodiments, an individually controllable light source can be allocated to each channel of the multi-channel optics. Mapping the respectively allocated sub-areas can then comprise the following sub-actions or sub-steps: receiving the overall image for projection by means of a dynamic imager; determining sub-image data of the overall image allocated to the sub-areas of the imaging plane; detecting and localizing the at least one elongated image feature of the overall image; identifying a subset of the channels of the multi-channel optics forming an array similar to the at least one elongated image feature; loading the sub-image data into the dynamic imager; and activating those light sources allocated to the channels of the subset.

In this way, the artificial overall aperture of the multi-channel optics can be adapted to an image currently to be projected and the image features contained therein. In particular, the image can be analyzed and an image axis or direction of minimum image dynamics can be determined for the image. Under the assumption that it will be least obvious for a viewer of the projected overall image when the projection is less focused in the determined image axis or direction than in other directions, the artificial overall aperture of the multi-channel optics can be oriented to the determined image axis or direction, so that in this direction a larger artificial overall aperture is obtained than in other directions, in favor of increasing the light flux to be projected. Depending on how exactly the direction of the largest artificial overall aperture of the multi-channel optics can be adjusted, a useful effect can already result when the image axis of minimum image dynamics and the direction of the largest artificial overall aperture incorporate an angle of up to 20 degrees, advantageously up to 10 degrees and further advantageously up to 5 degrees. For this purpose, the multi-channel optics and possibly also the imager can comprise, for example, a cross-shaped or star-shaped array of several one-dimensional or narrow arrays of optical channels or sub-areas between which can be switched depending on the determined image axis of minimum image dynamics.

As an alternative or in addition to the presence of individually controllable light sources for the channels of the multi-channel optics, a selection of channels adjusted to the image axis of minimum image dynamics can also take place by dimming or blanking sub-areas of the imager that are not necessitated.

Thus, embodiments show an increase of the depth of focus for one-dimensional structures by asymmetrical or anisotropic arrays of sub-apertures. It is also possible to arrange the sub-apertures as a symbol or the like in order to tailor the out-of-focus behavior of the projected pattern. Thus, the so-called blur of each image point corresponds to the symbol array of the sub-apertures.

Compared to classical projection systems, there is the option of a tailored depth of focus or mapping characteristics for one-dimensional periodic and non-periodic light patterns within strongly varying operating distances. Possible fields of application for embodiments are 3D measurement technology, illumination and information display.

Embodiments can also be supplemented by one or several features of a projection display which will be described below.

According to embodiments, a projection display can include an imager that is implemented to generate individual images in a distribution of sub-areas of an imaging plane of the imager, as well as a multi-channel optics that is configured to map one allocated sub-area of the imager each per channel, such that the mapping of the individual images is superimposed to an overall image in a projection area. The projection area is a non-planar free-form area or is tilted with respect to the imaging plane. The imager is implemented such that constellations of points in the individual images, which are each superimposed in a respective common point in the overall image by the multi-channel optics, differ in dependence on the distance of the respective common point in the overall image to the multi-channel optics.

In embodiments, the multi-channel optics can comprise a two-dimensional array of projection optics in a projection optics plane essentially parallel to an imaging plane, wherein the projection optics array is configured to map one allocated individual image of the imager each along a respective optical axis in the direction of the projection area, such that the mapping of the individual images are superimposed to the overall image in the projection area.

According to embodiments, the projection optics can have a decentration with respect to the allocated sub-areas, where a pitch of the projection optics is smaller than a pitch of the allocated sub-areas, so that the overall image superimposed in the projection area is real.

According to embodiments, the projection optics can have a decentration with respect to the allocated sub-areas, where the pitch of the projection optics is greater than or equal to the pitch of the allocated sub-areas, so that the overall image superimposed in the projection area is virtual.

According to embodiments, the projection optics can be centered with respect to the allocated sub-areas and have a collimating effect.

According to embodiments, the projection optics array can further comprise an overall lens, which is downstream with respect to the two-dimensional array of projection optics and cooperates with the two-dimensional array of projection optics, which is implemented to refocus collimated beams from the projection optics in a focal plane of the overall lens, wherein the projection optics are centered with respect to the allocated sub-areas and have a collimating effect, or to focus diverging/converging beams from the projection optics in an effective focal plane resulting from decentration between the projection optics on the one hand and the sub-areas on the other hand, and from focusing by the downstream overall lens.

According to embodiments, the overall lens can be implemented as optics having a variable focal length, so that an average projection distance is adjustable.

According to embodiments, the optics having a variable focal length can be a zoom lens or a liquid lens.

According to embodiments, each projection optics can have a lens vertex decentered with respect to the aperture of the respective projection optics, wherein a pitch of the lens vertices is greater or smaller than the pitch of the allocated sub-areas, so that the lenses effect a projection of the individual image of the respective sub-area along optical axes running divergently or convergently.

According to embodiments, a distance between the sub-areas and the respective projection optics can essentially correspond to a focal length of the respective projection optics.

According to embodiments, a distance between the sub-areas and the respective projection optics can essentially correspond to a focal length of the respective projection optics, such that the off-axis projection lenses have a greater focal length for correcting a defocus due to the greater image distance of these channels.

According to embodiments, the imager can further be implemented such that the constellations additionally differ depending on the solid angular range in which the respective common point lies, seen from the multi-channel optics, in order to compensate mapping errors of the multi-channel optics.

According to embodiments, the imager can further be implemented such that the constellations additionally differ depending on the solid angular range in which the respective common point lies, seen from the multi-channel optics, such that mapping errors of the multi-channel optics are compensated channel by channel.

According to embodiments, the imager can be implemented such that the difference between the constellations shows mainly in a centric extension between the constellations depending on the distance of the respective common point in the overall image from the multi-channel optics, so that first constellations of points in the individual images, which are each superimposed by the multi-channel optics in a respective common point in the overall image that is less distant from the multi-channel optics than a respective common point in the overall image in which points of second constellations are superimposed in the individual images by the multi-channel optics, are laterally more extended compared to the second constellation.

According to embodiments, the imager can be implemented to vary, for homogenizing the luminance across the overall image, the sum of the brightnesses of the points of constellations in the imaging plane depending on the distance of the respective common point in the overall image, to which the points of the respective constellations are superimposed by the multi-channel optics, to the multi-channel optics, by brightness variation of the points and/or variation of the number of sub-areas contributing a respective point for the respective constellation.

According to embodiments, the imager can be implemented such that the brightness variation of the points and/or the variation of the number of sub-areas contributing a respective point to the respective constellation are such that points of image areas of off-axis channels contribute less to the overall image.

According to embodiments, the imager can be implemented to generate the individual image from pixel array data representing the overall image by pre-distorting the pixel array data, so that a distortion of the overall image in the projection area due to tilting of the same relative to the imaging plane is corrected in this way.

According to embodiments, the imager can be a reflective imager or a transmissive imager with backlighting or reflective background or an emissive imager.

According to embodiments, the imager can be a transmissive imager that is implemented to display the individual images by lateral variation of the transmissivity, wherein the projection display comprises a light source and a field lens or a field lens array, and the field lens is arranged at a distance to the individual images, so that a Köhler illumination of the multi-channel optics is realized.

According to embodiments, the projection display can further comprise a further field lens for eliminating the illumination telecentry.

According to embodiments, in the projection display, at least part of the imager can be implemented passively, such as in the form of a finely structured mask.

According to embodiments, the imager and the multi-channel optics can be implemented such that identical individual images from different sub-areas are superimposed in the projection area in a pixel-precise manner.

According to embodiments, the projection display can be implemented to receive an image to be projected with a first gray/color level resolution, wherein the imager is implemented to display the individual images with a second gray/color level resolution that is smaller than the first gray/color level resolution, wherein the projection display is implemented to control, in dependence on a gray/color level value of the image to be projected, the sub-areas at an image point of the image to be projected such that in the overall image the individual images sum up to a gray/color level corresponding to the gray/color level value at a position corresponding to the image point.

According to embodiments, the imager and the projection optics array can be implemented such that the mappings of the individual images in the projection area are superimposed with a sub-pixel offset to one another, so that the overall image superimposed in the image plane has a higher resolution than the individual images.

According to embodiments, the imager can allow one or several of the following options for utilization settings independent of one another:

a) changing the individual images such that a change of an average projection distance of the projection area from the multi-channel optics with a respective translational shift of the position of the projection area results, b) changing the individual images such that a change in a tilting of the projection area with respect to the imaging plane results, and c) changing the individual images such that a change in a tilting of the projection area with respect to the imaging plane results, by simultaneously adapting a trapezoid distortion correction for compensating the distortion of the overall image in the projection are due to a tilting of the same relative to the imaging plane, d) changing the individual images such that a change in a deflection of the projection area with respect to a plane-parallel orientation to the imaging plane results, and e) changing the individual images such that a change in a deflection of the projection area with respect to the imaging plane results, by simultaneously adapting a distortion correction for compensating the distortion of the overall image in the projection area due to local mapping variation based on the deflection of the same relative to the plane-parallel orientation to the imaging plane.

According to embodiments, the projection display can further comprise a camera and an adjuster, wherein the adjuster is implemented to regulate, in an iterative process and by controlling the imager such that the same displays a test image, the projection area where the multi-channel optics superposes the individual images to the overall image, by recording the overall image such that the projection area is approximated to an actual projection surface.

According to embodiments, the method for displaying an overall image can further comprise the following steps:

generating individual images in a distribution of sub-areas of an imaging plane; and mapping, by one channel of a multi-channel optics each, one allocated sub-area of the imaging plane each, such that the mapping of the individual images is superimposed to an overall image in a projection area, wherein the projection area is a non-planar free-form area or is tilted with respect to the imaging plane, and generating the individual images is performed such that the constellations of points in the individual images, which are each superimposed at a respective common point in the overall image by the multi-channel optics, differ depending on the distance of the respective common point in the overall image to the multi-channel optics.

According to embodiments, the projection display can further comprise: an imager that is implemented to generate individual images in a distribution of sub-areas of an imaging plane of the imager; and a multi-channel optics that is configured to map one allocated area of the image each per channel, such that the mapping of the individual images is superimposed to an overall image in a projection area. The projection area can be a non-planar free-form area or can be tilted with respect to the imaging plane, and the imager and the multi-channel optics can be implemented such that a characteristic of a contribution of each channel to the overall image varies locally across the overall image depending on the distance of the respective common point in the overall image to the multi-channel optics.

According to embodiments, the imager and the multi-channel optics can be implemented such that a number of superimposed channels vary locally across the overall image in dependence on the distance of the respective common point in the overall image to the multi-channel optics.

According to embodiments, the imager and the multi-channel optics can be implemented such that a first set of channels is implemented to limit the superposition to the overall image to a first portion of the overall image, which lies in a first interval of distances to the multi-channel optics, and a second set of channels disjoint to the first one is implemented to limit the superposition to the overall image to a second portion of the overall image, which lies in a second interval of distances to the multi-channel optics comprising distances that are greater than all the distances of the first interval, and that constellations of points in the individual images that are each superimposed by the first set of channels of the multi-channel optics in a respective common point in the first portion in the overall image, result essentially by a centric extension with a first extension ratio from a constellation of locations where a projection of aperture centers of the channels of the first set is arranged, and constellations of points in the individual images that are each superimposed by the second set of channels of the multi-channel optics in a respective common point in the second portion in the overall image, result essentially by a centric extension with a second extension ratio from a constellation of locations where a projection of aperture centers of the channels of the second set is arranged, and wherein the first extension ratio is greater than the second extension ratio.

According to embodiments, the multi-channel optics can be implemented such that the channels of the first set are focused to smaller distances to the multi-channel optics than the channels of the second set.

According to embodiments, the imager can be implemented such that constellations of points in the individual images that are each superimposed in a respective common point in the overall image by the channels of the first set of the multi-channel optics, or constellations of points in the individual images that are each superimposed in a respective common point in the overall image by the channels of the second set of the multi-channel optics, differ from each other in dependence on the distance of the respective common point in the overall image to the multi-channel optics.

According to embodiments, a method for displaying an overall image can comprise the following steps:

generating individual images in a distribution of sub-areas of an imaging plane; and mapping, by one channel of a multi-channel optics each, one allocated sub-area of the imaging plane each, such that the mapping of the individual images is superimposed to an overall image in a projection area, wherein the projection area is a non-planar free-form area or is tilted with respect to the imaging plane, and generating and mapping are performed such that a characteristic of a contribution of each channel to the overall image varies locally across the overall image depending on the distance of the respective point in the overall image to the multi-channel optics.

The following description of FIGS. 8 to 11 relates to projection displays that can be considered as possible starting points for developing embodiments described herein. The reference numbers used in FIGS. 8 to 11 do not necessarily correspond to the reference numbers used above.

Figure 8:
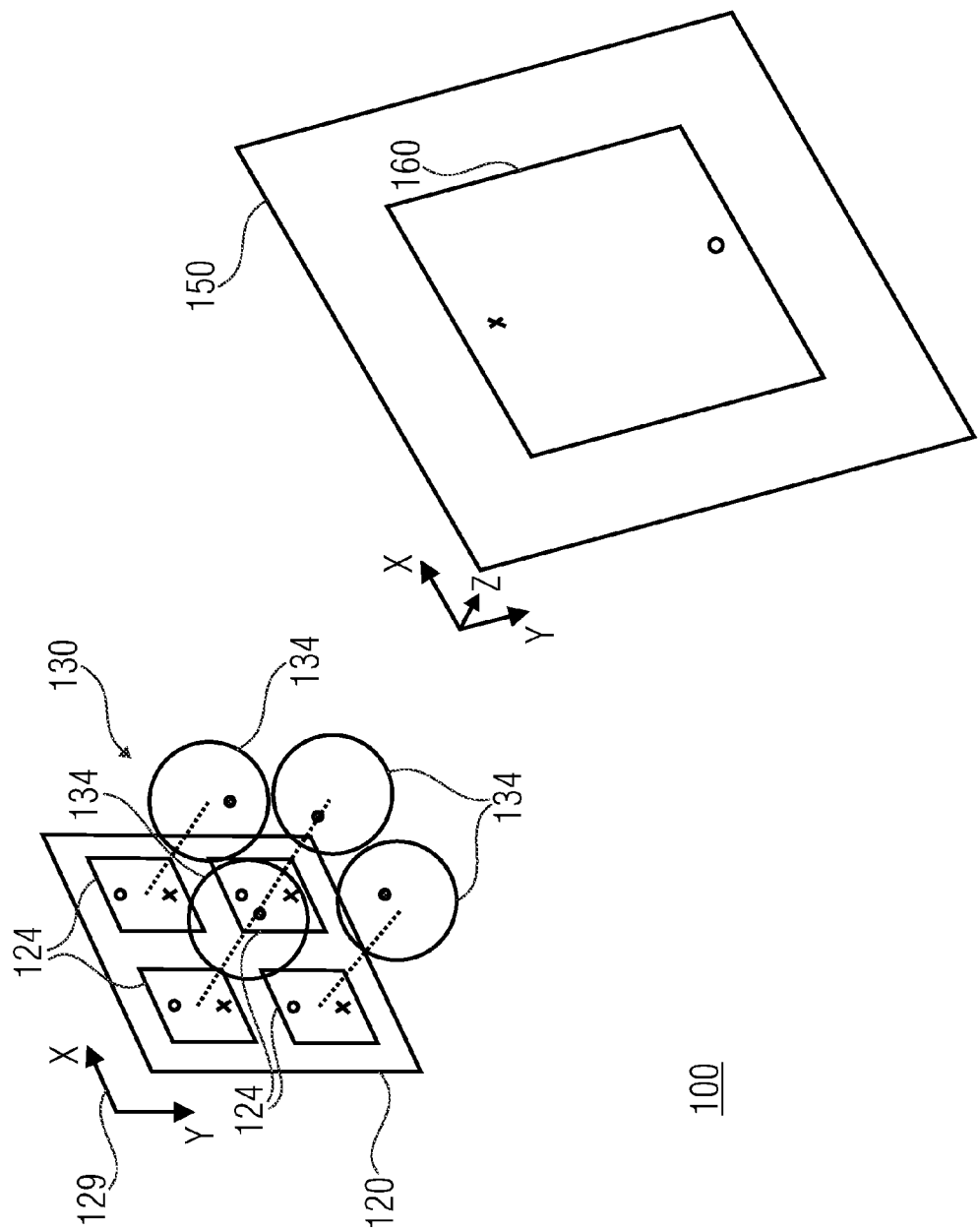
FIG. 8 is a schematic block diagram of a projection display which can serve as a basis or starting point for embodiments described herein.

FIG. 8 shows a projection display 100 representing a possible starting point for the development of embodiments described herein. The projection display 100 comprises an imager 120 and a multi-channel optics 130. The imager 120 is implemented to generate or display individual images in a distribution of sub-areas 124 of an imaging plane 129 of the imager. The multi-channel optics 130 is configured to map one allocated sub-area 124 of the imager 120 each per channel, such that the mapping of the individual images is at least partly superimposed to an overall image 160 in a projection area 150.

In FIG. 8, the projection display 100 is exemplarily structured with four channels, i.e. the imager 120 generates individual images in four sub-areas 124, and the multi-channel optics 130 is accordingly structured with four channels, having, for example, one respective projection optics 134 per channel. However, the number is merely exemplary. The two-dimensional distribution of sub-areas 124 and the projection optics 134 is also merely exemplary.

The distribution could also be realized along a line. Additionally, the distribution is not limited to even two-dimensional distributions. As will be discussed in more detail, the pitch of the projection optics 134 is reduced, for example, with respect to the pitch of the sub-areas 124 in the imaging plane 129. Details in this regard will be provided below.

The projection display 100 of FIG. 8 is implemented such that the projection area does not have to be a plane projection area in parallel to the imaging plane 129. The projection area where the overall image results, i.e. where the individual images are overlapped in a focused manner, i.e. quasi the depth of focus range, can rather be a free-form area or a projection area 150 tilted with respect to the imaging plane 129, as shown exemplarily in FIG. 8.

In order to compensate the deviation with respect to the plane-parallel orientation of the projection area 150 with respect to the imaging plane 129, the imager 120 is implemented such that constellations of points in the individual images that are each superimposed in a respective common point in the overall image 160 by the multi-channel optics 130 differ in dependence on the distance of the respective common point in the overall image to the multi-channel optics 130. FIG. 8 indicates two such common points in the overall image 160 exemplarily, namely one with an x and the other with an o. The points in the individual images of the sub-areas 124 corresponding to these points across the multi-channel optics 130 are accordingly also indicated by an x or an o. The position of points o or the positions of the points x in the imaging plane 129 each form a constellation. The constellation of the points o and the constellation of points x differs in order to compensate the fact that the distance of the common point x along the optical axis of the projection display, in FIG. 8 exemplarily the normal direction or z-axis to the imaging plane 129, to the projection display 100 or the multi-channel optics 130 is smaller than the distance of the common point o. As will be discussed in more detail below, the difference in the constellations caused by the different distances shows itself mainly in a greater extension in the sense of a centric extension of the constellation of the points x in relation to the constellation of the points o. However, the constellations can also differ in dependence on the solid angular range in which the respective common point o or x lies in relation to the optical axis, here exemplarily z, seen from the multi-channel optics 130, in order to compensate mapping errors of the multi-channel optics 130 or the individual projection optics 134. In particular, the solid angular range differences can be implemented such that mapping errors of the multi-channel optics 130 are compensated channel by channel. The exact connections will be discussed in more detail in the following description.

In other words again, the projection display of FIG. 8 will be explained based on a specific implementation, wherein, exemplarily, detailed images of all four channels overlap each other completely or congruently. As already mentioned above, however, this is not mandatory. A different overlapping of the individual images from the overall image 160 is also possible.

The individual images in the sub-areas 124 are thus essentially equal as regards content. They all represent a version of the overall image 160. Possibly, the individual images in the sub-areas 124 or the sub-areas themselves are distorted with respect to the square overall image 160, for example, with a pre-distortion which can be the same for all individual images. The pre-distortion corrects, for example, the distortion as it results from the divergence of the optical path of the channel-by-channel mappings or the enlargement by the channel-by-channel mappings in dependence on their focal length and the distance to the projection area and the resulting change in scale across the overall image 160 due to the deviation of the projection area 150 from the actual image plane to the multi-channel optics 130, which can, for example, be in infinity. The pre-distortion might also not be identical across all channels. In order to address a distortion (third-order) exceeding first-order aberrations (trapezoid), it can be advantageous to pre-distort the individual images or sub-areas 124 differently, since different decentrations of the respective channels exist. A change of constellations across the array for tilted projection areas will additionally be discussed below.

The individual images in the sub-areas 124 pre-distorted with respect to the overall image 160 differ from one another in order to realize the above-mentioned constellations of points in the sub-images 124 corresponding to a common point in the overall image 160, such that the focus of the overall imager 160 is maintained across the whole lateral extension, despite the depth variation of the projection area 150 along the optical axis z of the projection display 100.

Further differences in the individual images in the sub-areas 124 can result from the above-mentioned channel-wise correction of mapping errors of the multi-channel optics 130, which, however, does not, for example, depend on the lateral variation of the distance of the projection area from the projection display 100.

In this way, the overall image 160 can be projected onto the projection area 150 such that the same appears undistorted and focused from a specific angle of view, such as perpendicular onto the projection area 150.

Figure 11:
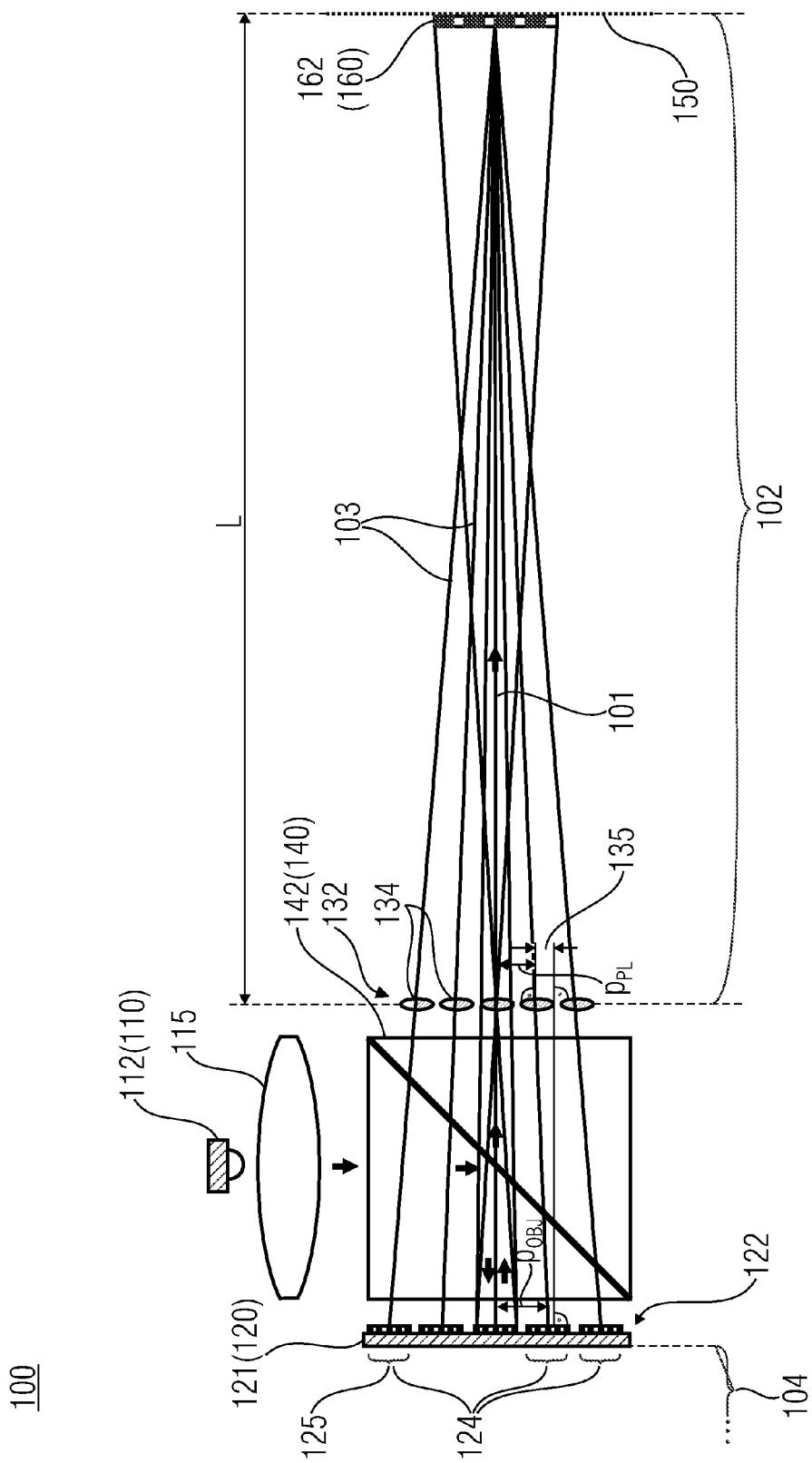
FIG. 11 is a side view of a projection display which can serve as a basis or starting point for embodiments described herein.

The projection display 100 of FIG. 11 can serve different purposes and can be used in different fields of application. The projection display of FIG. 8, for example, is intended to project a specific overall image in a focused manner onto a predetermined projection area 150, which has a constant and stationary position with respect to the projection display 100. The projection display 100 could, for example, be intended to project an overall image 160 onto a sculpture whose external surface forms the projection area 150, which represents a logo or another content, for example, wherein in this type of application the projection display 100 is intended to be and remain arranged in a fixed position to the sculpture. In this case, the image 120 can be a shadow mask or another finely structured mask, for example, which is illuminated, for example, from the rear side opposing the multi-channel optics 130, such as by means of a Köhler illumination. The individual images can be realized in the sub-areas 120 in a binary-encoded, gray level or even color-coded manner, either in analogue or continuous or pixelated form. In particular, the mask 120 could be a slide or the sub-areas 124 could be individual slides.

Encoding the image information could in particular be realized by means of mapping the image information onto a transmission scale. One example of backlighting will be discussed below. However, imagers 120 in the form of a mask could also operate in a reflective manner in order to generate static individual images in the sub-areas 124.

However, instead of a passive or static imager 120, an active imager, such as a digital imager 120, can be used. The imager can operate in a transmissive or reflective manner. However, it is also possible for the imager 120 to be self-illuminating, such as an OLED or an LED display. In these cases it is possible for the imager to be internally implemented, as will be discussed in more detail below, to perform the above-mentioned processings that only provide the position and content, namely the individual images of the sub-areas 124, from incoming pixel array data representing the overall image 160 in order to be subsequently displayed by the imager 120, adapted to a specific relative position of the projection area 150 to the projection display 100, whereby in particular adaptation to different projection area geometries is possible by adapting or re-performing the pre-processings accordingly. This will also be discussed in more detail below.

Finally, it should be noted that the imager 120 and the multi-channel optics 130 could be kept stationary to each other, such as built into a housing. In particular, the projection display 100 can be built into a mobile device such as a mobile phone, a PDA, a notebook or any other portable computer or the like.

After a projection display has been generally described above, now, with reference to FIGS. 9 and 10, different options will be discussed as to how the optical or mechanical part of the projection apparatus 100 can be designed.

Figure 9:
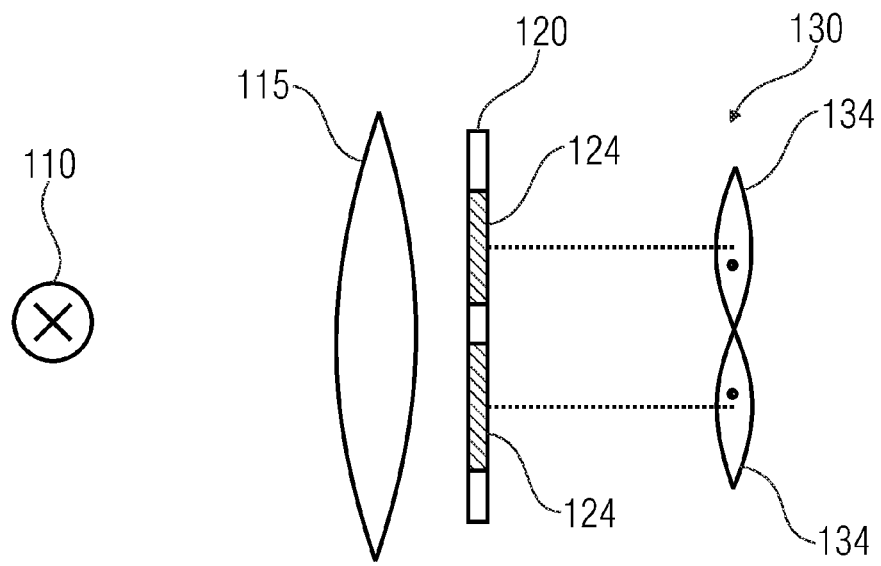
FIG. 9 is a schematic side view of a projection display which can serve as a basis or starting point for embodiments described herein.

FIG. 9 shows an implementation of a projection display according to FIG. 8, where the imager 120 works transmissively or represents the individual images in the sub-areas 124 by displaying or encoding the brightness variation or color variation in the individual images by lateral variation during transmission. As is shown in FIG. 9, for realizing backlighting, i.e. lightning or illumination from a side of the imager 120 facing away from the multi-channel optics 130, the projection apparatus can comprise a light source 110 and a field lens 115. The distance between the sub-images 124 and the field lens 115 is selected to be small in order to realize the complete illumination of the imager 120. Köhler illumination of the multi-channel optics 134 is realized additionally or alternatively, according to which the field lens 115 maps the light source 110 into the opening of the pupil of the projection optics 130.

Figure 10:
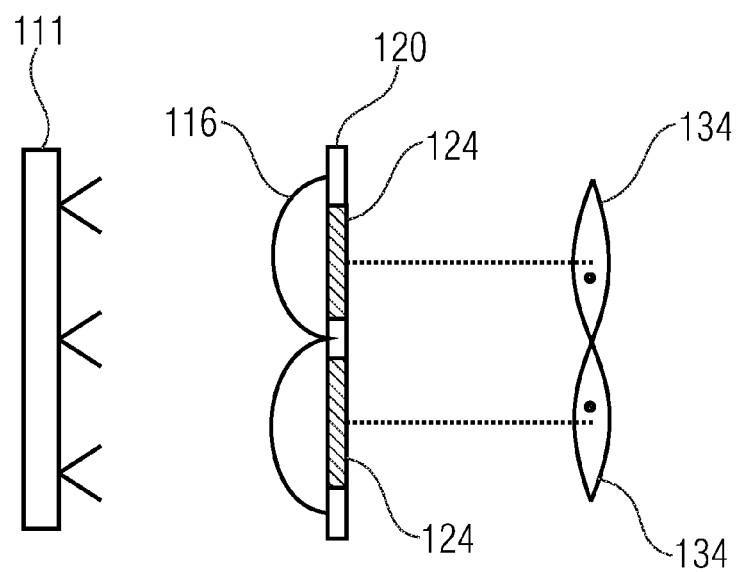
FIG. 10 is a schematic side view of a projection display which can serve as a basis or starting point for embodiments described herein.

FIG. 10 shows that a field lens array 116 could be used instead of a field lens and that additionally or alternatively a planar light source 111 could be positioned on the rear for illumination instead of a point-shaped light source 110, i.e. such that the field lens array 116 or the field lens 115 is arranged between light source 111 and imager 120. Here, also, Köhler illumination can be realized. The planar light source can be, for example, an array of LEDs having allocated collimation optics for realizing also very flatly structured illumination units.

The imager 120 could, for example, be a reflective LCD imager 120, and likewise the imager according to FIGS. 9 and 10 could, for example, be a transmissive LCD imager.

Now that the basic implementation options of the projection display of FIG. 8 have been described above, possible details of the optical array of a projection display will be discussed based on the following figure. For explaining the optical structure, the case is assumed that the projection area 150 is planar and runs in parallel to the imaging plane of the imager. However, these statements will also show that the optical structure of the projection display fulfils the desire for focused projection onto a differently shaped or positioned projection area in that, due to the multi-channel optical structure, the optical depth of focus is basically present anyway. Based on normally very short focal lengths of several millimeters, for example, the depth of focus range of each individual projector or each channel in the array 132 is very high compared to a conventional single-channel array. This circumstance is used in the projection displays illustrated in FIGS. 8 to 11 in order to produce the actual focus of the projection onto a tilted or a free-form shaped projection area in that the individual images or sub-areas are changed appropriately with respect to a plane-parallel orientation of the projection area, which in the case of a digital imager necessitates merely, for example, digital image pre-processing. This measure of changing the individual images can be performed in addition to the measures described above, according to which different overall apertures of the multi-channel optics and hence also different depths of focus are provided for different directions within the overall image in order to correspond to an image structure (e.g. one or several elongated image features).

FIG. 11 shows a side view of a projection display 100 which can also be considered as a possible starting point for developing embodiments presented herein. The projection display 100 shown in FIG. 11 comprises a light source 110, an imager 120 here exemplarily implemented reflectively, a two-dimensional array 132 of projection optics 134 as multi-channel optics 130, and a beam splitter 140. Here, the imager 120 is implemented to display individual images in a two-dimensional distribution 122 of sub-areas 124 of the same. Further, the two-dimensional array 132 of projection optics 134 is configured to map an allocated sub-area 125 of the imager 120 along the optical axis 103, so that mappings of the individual images are superimposed to an overall image 160 in the projection area 150. Finally, the beam splitter 140 is arranged in an optical path between the imager 120 and the two-dimensional array 132 of projection optics on the one hand, and in the optical path between the light source 110 and the imager 120 on the other hand.

In particular, in further implementations, the beam splitter 140 can have a polarizing effect and the reflective imager 120 can be implemented to display the individual images in the form of a polarization influence.

The projection display can comprise a regular two-dimensional array of imaging areas on the imager 120, which is implemented, for example, as liquid crystal imager 121, a beam splitter 140, which is implemented, for example, as polarizing beam splitter 142, and the two-dimensional array 132 of projection optics 134. As is shown in FIG. 11, light from the light source 110, for example implemented as LED 112, passes through condenser optics 115 first and is then directed onto the polarizing beam splitter 142. From there it is reflected in a polarized manner in the direction of the reflective imager 120, which is, for example, an LCoS (liquid crystal on silicon) imager.

Depending on the gray value of the image point to be displayed, the imager, which is, for example, digital, rotates the polarization direction of the light reflected on the same and thus controls the transmission during the second passage through the polarizing beam splitter. The fast pixel-by-pixel switching of the voltages or crystal rotations allows the display of dynamic image content.

The projection optics 134 shown in FIG. 11 can, for example, be microlenses implemented in an even, two-dimensional array as projection objectives, each mapping a sub-area 125 of the imager 120 onto the projection area 150 or a screen. By using such a projection optics array, it becomes possible to drastically reduce the structural length of the overall system with respect to conventional single-channel projections of the same image size. While a small structural length of the projection display or projection system results from focal lengths of the projection optics or lenses of few millimeters, for example, wherein their focal lengths again depend on the dimensions of the beam splitter, multiplying the object areas or their lateral extension provides a proportional increase of the image brightness. Thus, compared to miniaturized single-channel projectors, a structural length is obtained which exceeds the thickness of the beam splitter by only a few millimeters, with comparative lateral extension and projection distances.

In further implementations, the projection image can result by superposition, joining or interleaving the mappings of individual channels of the array.

In further implementations, the projection optics 134, as is exemplarily shown in FIG. 11, show a decentration with respect to the allocated sub-areas 124.

Generally, the decentration can be considered as a central compression or extension with respect to a central optical axis 101 or as a lateral offset of the projection optics 134 with respect to the allocated sub-areas 124 of the imager 120. Decentration of the projection optics with respect to the allocated individual images onto the imager is decisive for the projection distance. Due to a high depth of focus of the sub-images, the focus at the projection distance depends only in a limited manner on the screen-side focusing of the individual projection optics. On the object side, as has already been mentioned, focusing of the projection optics 134 can be adjusted, for example, in relation to the short focal length of the projection optics exactly such that the imaging plane 129 is within the focal length of the projection optics 130. However, this is not mandatory. As has already been mentioned, for virtual images or very close projection distances, the imaging plane 129 can be a short distance in front of or behind the same. Depending thereon, the screen-side focusing is, for example, in infinity, but the depth of focus range of the individual channels is large due to the relatively short focal lengths. This circumstance is used according to FIG. 8 and also the following description when the image or the projection area 150 does not run plane-parallel to the imaging plane 129 but is tilted from the same or varies in a different way according to a free-form area.

Due to a slightly reduced pitch of the projection optics or projection optic lenses with respect to the imaging structures, an offset 135 of the respective imaging structure and the respective projection optics results, which increases from the central optical axis 101 of the two-dimensional array 132 of projection optics 134 or from the array center (raster center) towards the outside. The resulting slight tilting of the optical axes 103 of external projection optics 134 or projectors with respect to the central optical axis 101 or the central channel provides a superposition of individual mappings in the image plane or projection area 150 to the overall image 160. Here, the image plane or projection area can be in infinity or can be at a finite distance from the projection optics in front of the imager or behind the imager. As is shown in FIG. 8, the area in front of the imager is defined by the area 102 at the right of or in the optical path behind the two-dimensional array 132 of the projection optics 134, while the area behind the imager is defined by the area 104 at the left of the imager 120 or on the side of the imager 120 facing away from the beam splitter 140. The individual mappings can be superimposed to the overall image, for example, on a screen.

Here, no further macroscopic optical elements are necessitated for projection in the optical path. The projection distance L of the array projection display (i.e. the average distance L of the projection area 150 from the two-dimensional array 132 of the projection optics 134 perpendicular to the same) which is, for example, an average projection distance in the case of a non-plane-parallel projection area 150, results from the focal length of the projection optics f, the pitch of the projection optics $p_{PL}$ and the pitch of the images $p_{OBJ}$. The enlargement M of the mappings results from the ratio of the projection distance L to the focal length of the projection lens f. Here, the following relations apply:

$$L = \frac{f \cdot p_{PL}}{p_{OBJ} - p_{PL}}$$

$$M = \frac{L}{f} = \frac{p_{PL}}{p_{OBJ} - p_{PL}}.$$

Thus, the ratio of pitches of object structures to projection optics or their difference controls the projection distance. Here, it should be considered that in the case of a non-plane-parallel projection area 150, the pitch of the sub-areas 124 $p_{OBJ}$ represents, for example, the average of all corresponding points in the individual images, or an average of the distances of the centroids of the sub-areas 124 that might, for example, be distorted, on the one hand for compensating the optical distortion as described above with reference to FIG. 8, and on the other hand for local focus re-adjustment.

If the pitch of the projection optics is smaller than that of the imaging structures, a real image will result at a defined distance. In the case shown in FIG. 8, the pitch $p_{PL}$ of the projection optics 134 is smaller than the pitch $p_{OBJ}$ of the allocated sub-areas 124. Thus, in the configuration in FIG. 8, an overall image 162 which is superimposed in the projection area 150 is real. FIG. 11 is also based on this example.

Figure 12:
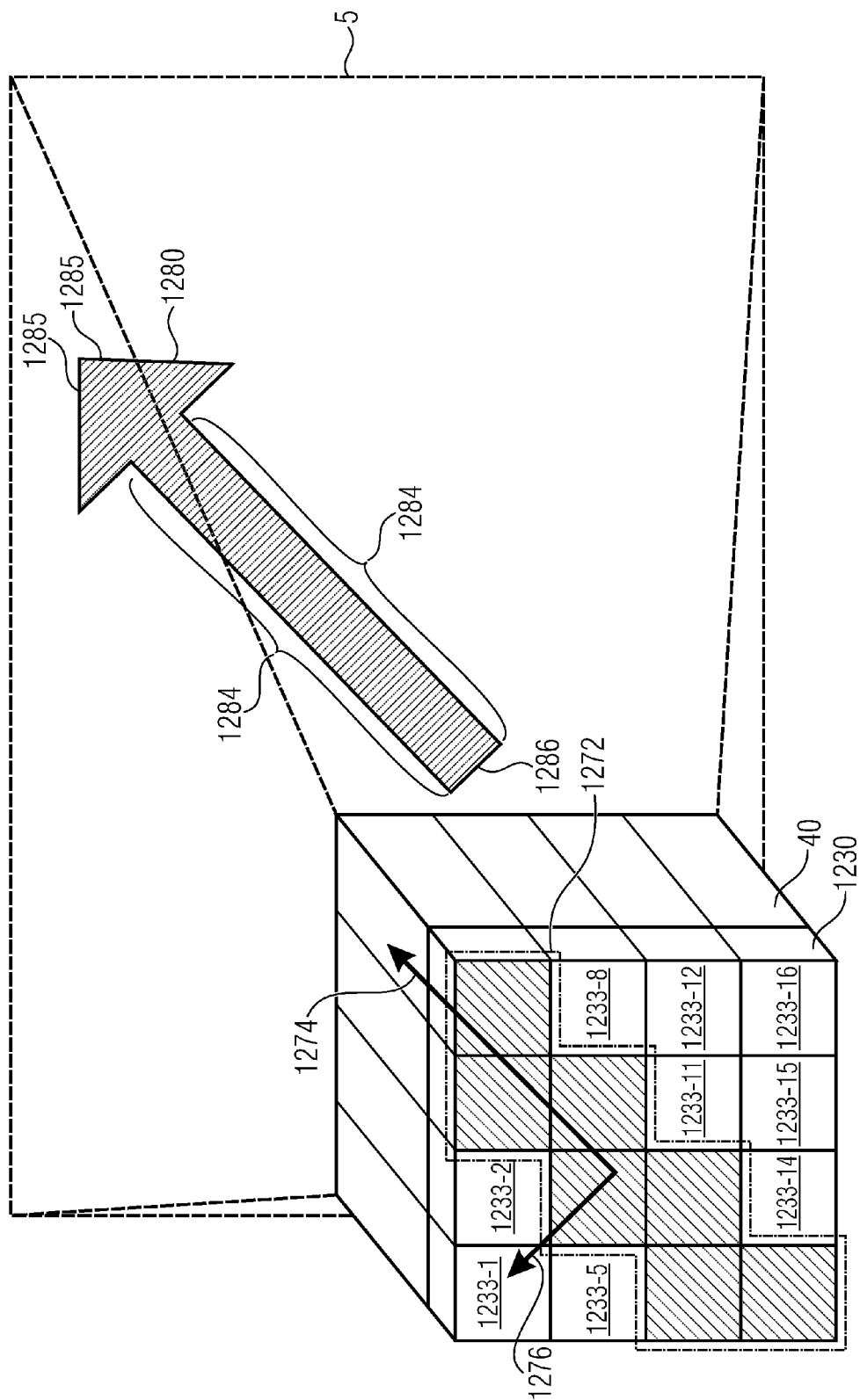
FIG. 12 is a schematic view of a projection system according to further embodiments.

FIG. 12 shows a schematic illustration of a projection system and an overall image 5 projected by the projection system. The projection system includes a multi-channel optics 40 including several optical channels (here, 16 optical channels in a 4×4 array) and comprises an at least temporary anisotropic overall aperture with a main aperture axis 1274 and a secondary aperture axis 1276 orthogonal thereto. The temporary anisotropic overall aperture is indicated in FIG. 12 by a dash-dotted frame 1272. Further, the projection system comprises a plurality of imagers 1230, each allocated to one of the optical channels and configured to display one sub-image each, which is projected by means of the allocated optical channel, wherein the projected sub-images are combined to the projected overall image 2. In the example shown, the plurality of imagers includes 16 imagers 1233-1 to 1233-16. The projected overall image 2 comprises a predominant edge direction illustrated in FIG. 12 by an arrow 1280. The arrow 1280 also represents the image content of the projected overall image 5. In this illustrating example, it can be seen that the edges 1284 of the arrow 180 extend in the same direction as the predominant edge direction. Normally, it is intended that the relatively long edges 1284 are mapped as focused as possible, whereas it is possible to accept a certain blurring for the shorter edges 1285 and 1286. For obtaining this, the temporary anisotropic overall aperture 1272 is oriented such that the main aperture axis 1274 incorporates a smaller angle with the predominant edge direction 1280 than the secondary aperture axis 1276. The temporary anisotropic overall aperture is obtained by deactivating several imagers in the left top corner as well as in the bottom right corner of the 4×4 array of imagers 1230.

Figure 13:
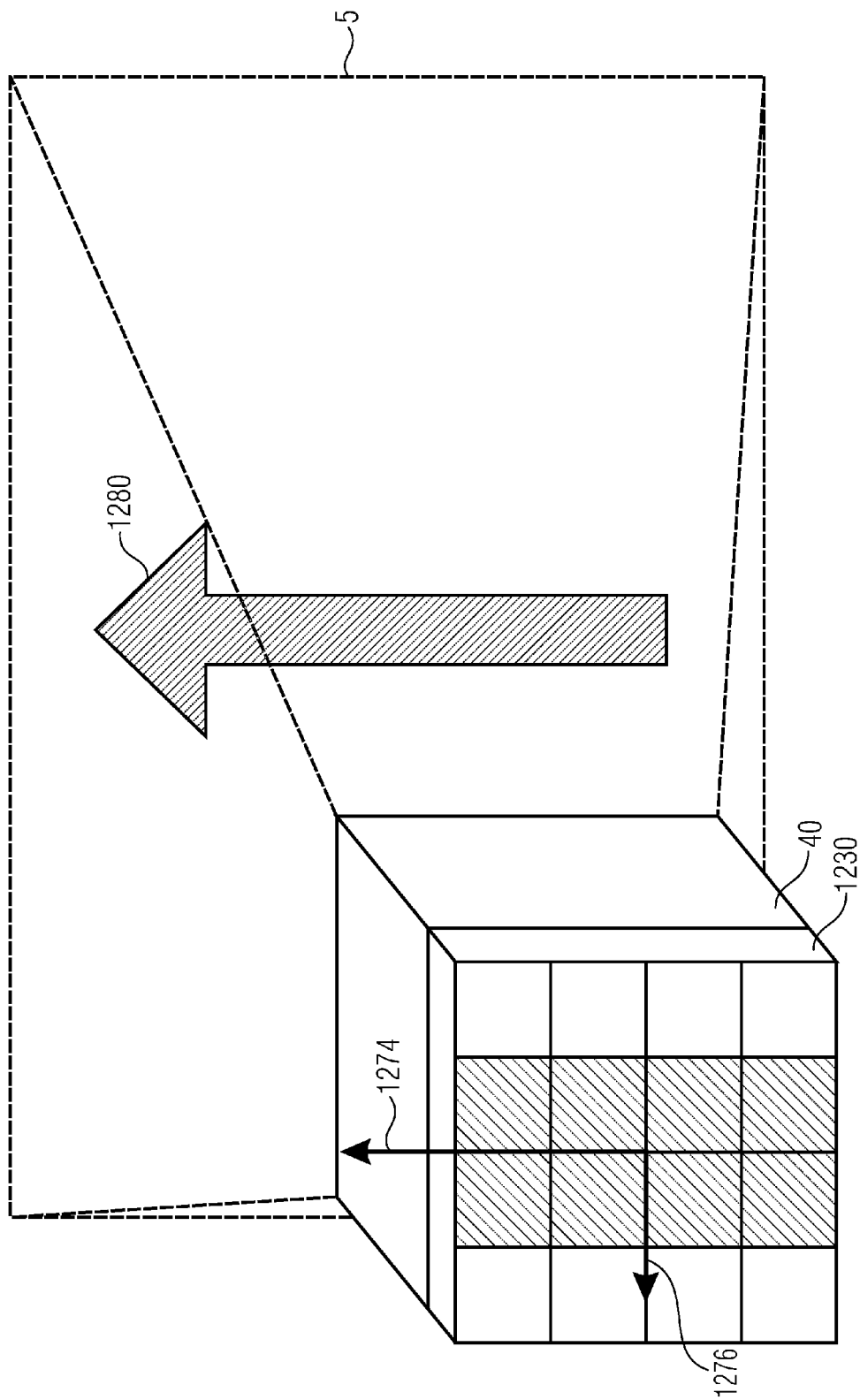
FIG. 13 is a schematic view of the projection system of FIG. 12 during projection of another image, where the predominant edge direction is different than in FIG. 12.

FIG. 13 shows a schematic illustration of the projection system of FIG. 12 projecting an overall image 5 having a different image content whose predominant edge direction (illustrated by the arrow 1280) now points to the top. Accordingly, the main aperture axis 1274 now points to the top. Of the 16 imagers and optical channels, the eight imagers of the second and third columns of the 4×4 array are used. The imagers of the left column and the right column are deactivated. Alternatively, for example, the first and second columns or the third and fourth columns could also be used.

Normally, the predominant edge direction is 180 degrees rotationally symmetric, so that in FIG. 13 the predominant edge direction could also point to the bottom. The anisotropic overall aperture is normally also 180 degrees rotationally symmetric.

Figure 14:
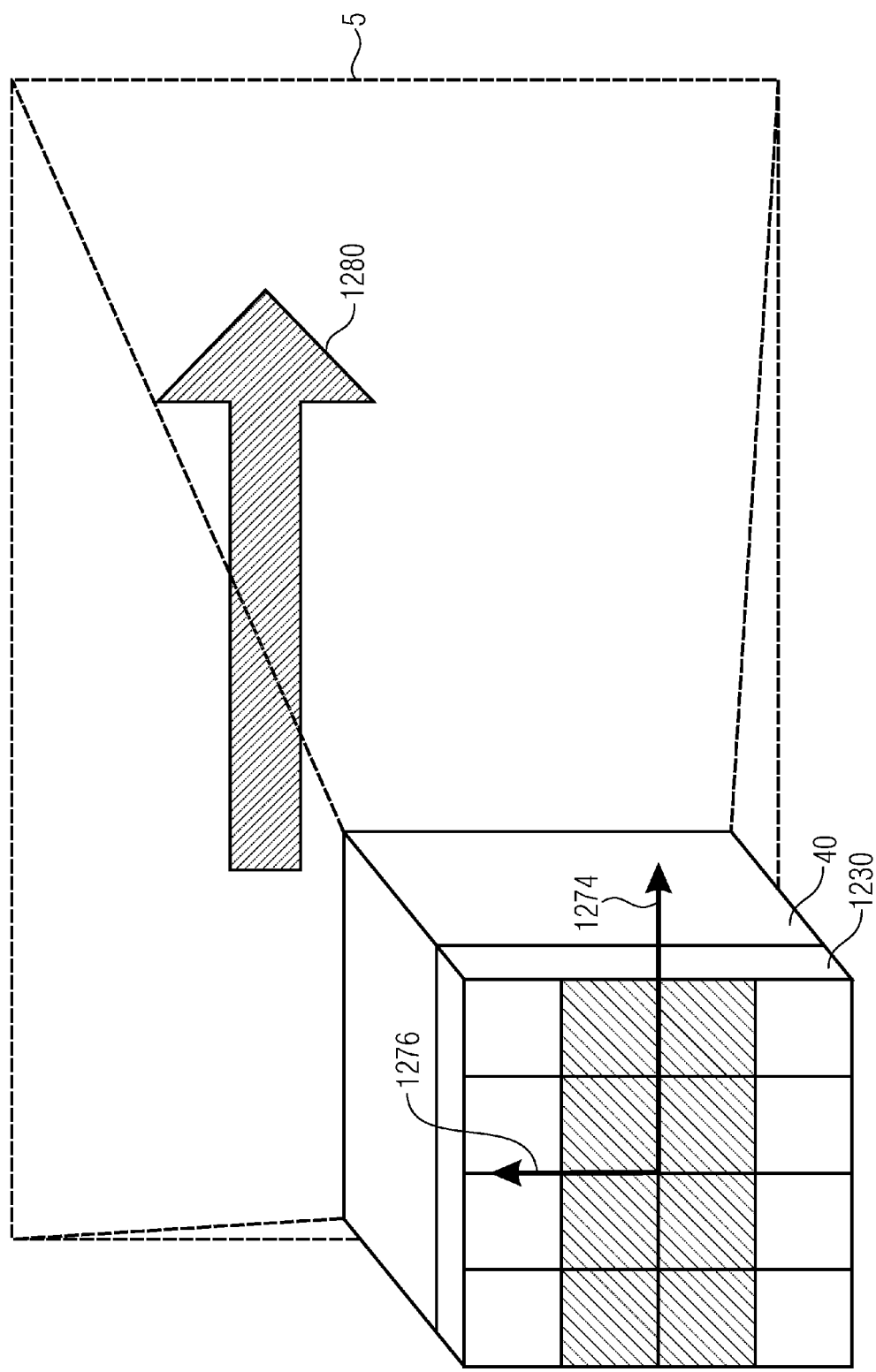
FIG. 14 is a schematic view of the projection system of FIG. 12 during projection of a further different image having a different edge direction.

FIG. 14 shows a further situation where the predominant edge direction of the projected overall image points to the right. Accordingly, the temporary anisotropic overall aperture is also selected such that its main aperture axis 1274 points to the right, which is obtained by using the two central rows of the 4×4 array of imagers as well as the allocated optical channels. Alternatively, also, the first and second rows or the third and fourth rows could be used.

Figure 15:
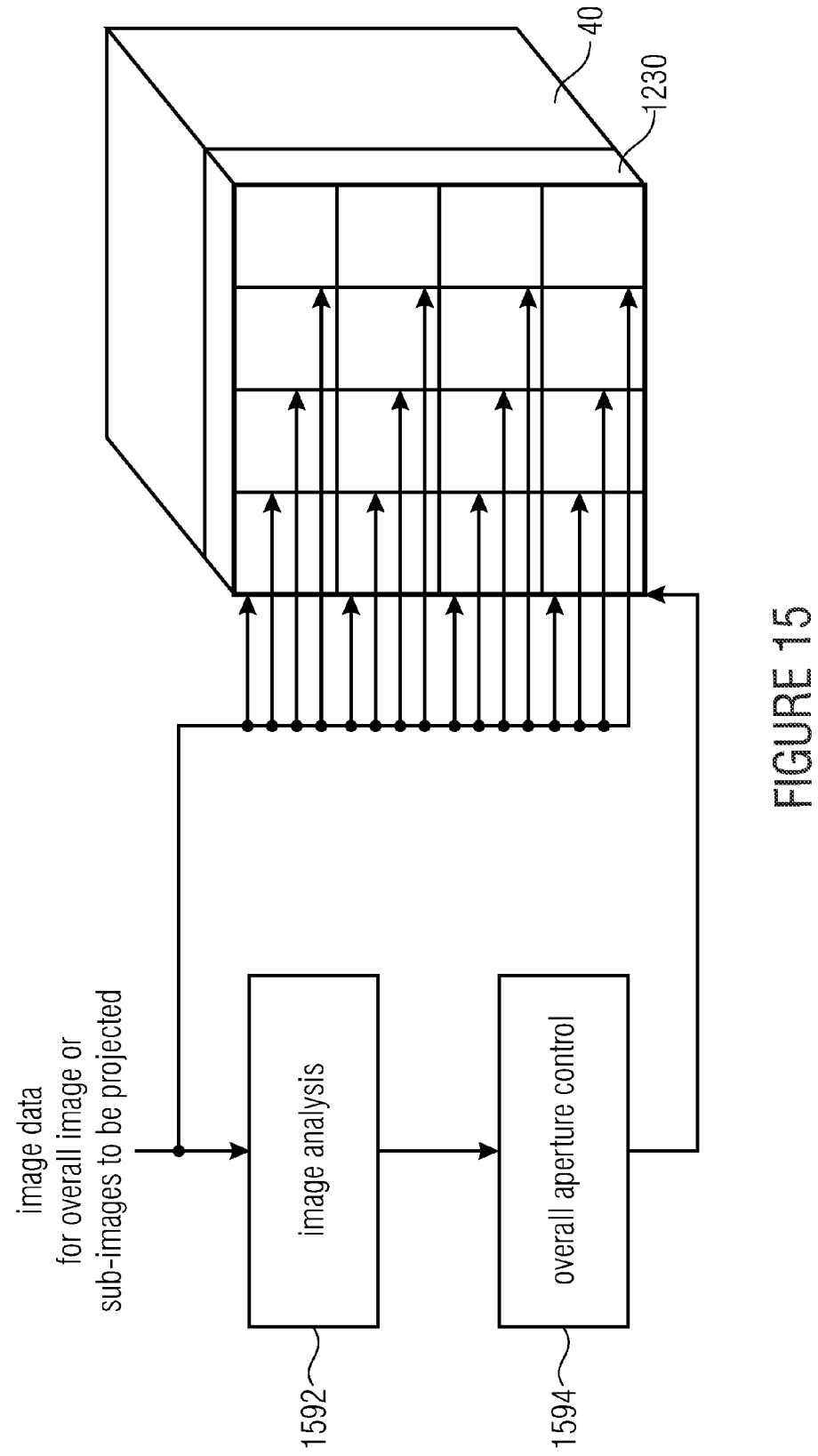
FIG. 15 is a schematic block diagram of a projection system with an image analysis means for dynamic determination of the current main aperture axis of the multi-channel optics.

FIG. 15 shows a schematic block diagram of a projection system having a multi-channel optics 40, a plurality of imagers 1230, an image analysis means 1592 and an overall aperture control 1594. The image analysis means 1592 is configured to determine or to estimate the predominant edge direction of the projected overall image from image data of the sub-images or from the image data of the overall image to be projected. The overall aperture control 1594 is configured to orient the overall aperture of the multi-channel optics 40 to the predominant edge direction. The image analysis means 1594 transmits the predominant edge direction to the overall aperture control 1594, which then selects a subset of the plurality of imagers 1230 which are used for the projection of the overall image 5.

Figure 16:
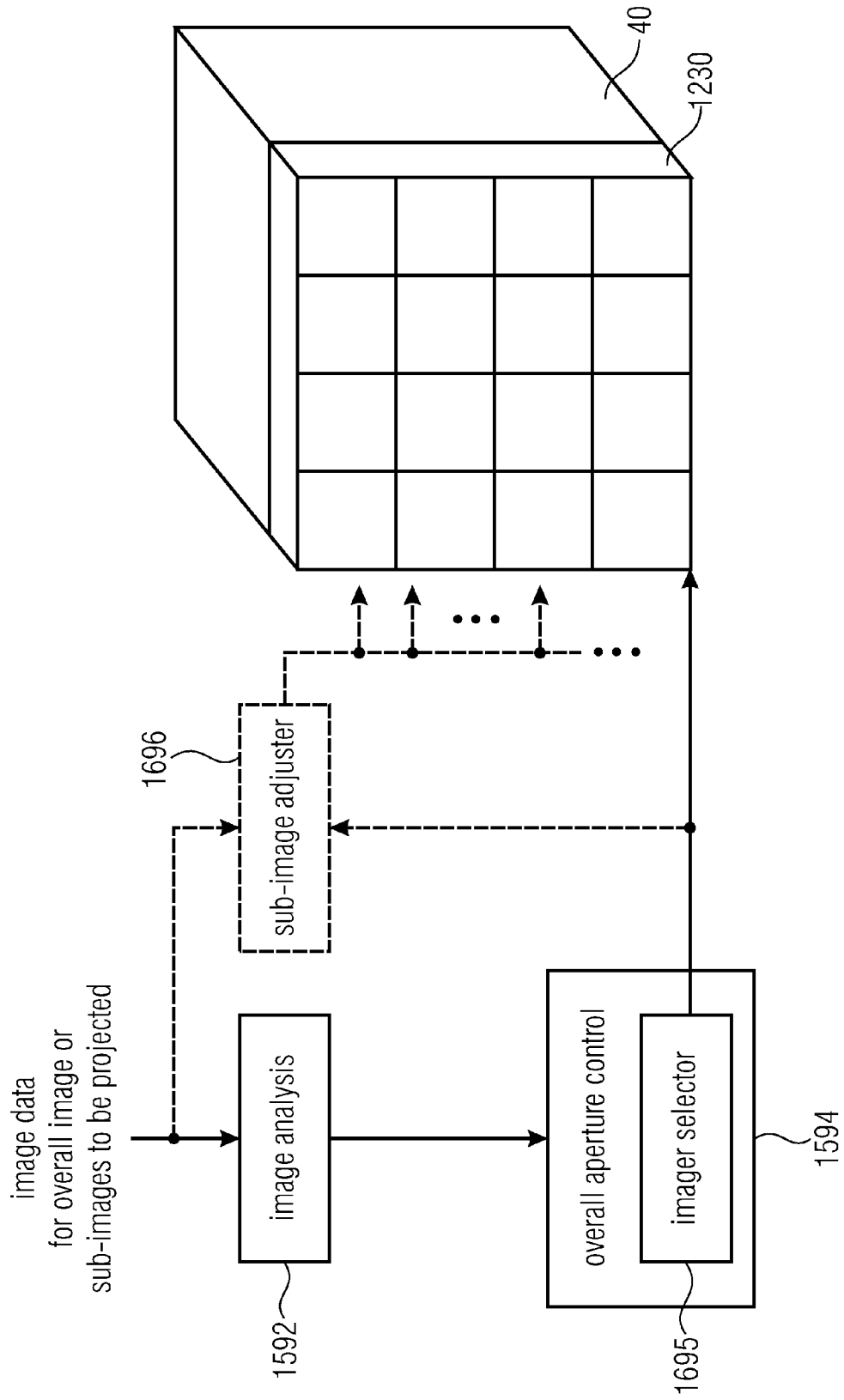
FIG. 16 is a schematic block diagram of a projection system which is based on the projection system of FIG. 15 and further comprises an imager selector.

FIG. 16 shows a schematic block diagram showing a projection system according to a further embodiment. In addition to the elements shown in FIG. 15, the projection system in FIG. 16 includes an imager selector 1695 as part of the overall aperture control 1594. The imager selector 1695 is configured to select a subset of the imagers 1233-1 to 1233-16 based on the predominant edge direction, wherein the subset of the imagers is elongated and a longitudinal axis of the subset of the imagers incorporates an angle with the predominant edge direction that is less than 30 degrees. In further embodiments, this angle is less than 45 degrees (or between 0 and 45 degrees), less than 35 degrees, less than 25 degrees, less than 20 degrees, less than 15 degrees, less than 10 degrees or less than 5 degrees. Normally, the longitudinal axis of the subset of images corresponds to the main aperture axis 1274. The longitudinal axis can be determined by means of an enveloping or circumscribing ellipse circumscribing the subset.

Further, the projection system in FIG. 16 can comprise an optional sub-image adjuster 1696 that is configured to adjust the sub-images with respect to at least one of intensity, position with respect to the respective imager and orientation with respect to the respective imager. In this way, possible changes in the mapping behavior of the projection system caused by the selection of the sub-image set, for example reduced brightness and intensity, are compensated as far as possible. Generally, the projection system can be dimensioned such that it is sufficient for only part of the existing optical channels to be used, while the remaining optical channels are deactivated. A respective portion (minimum number of active imagers/overall number of imagers) can, for example, be 50%, 60%, 70%, 80% or 90%.

Figure 17:
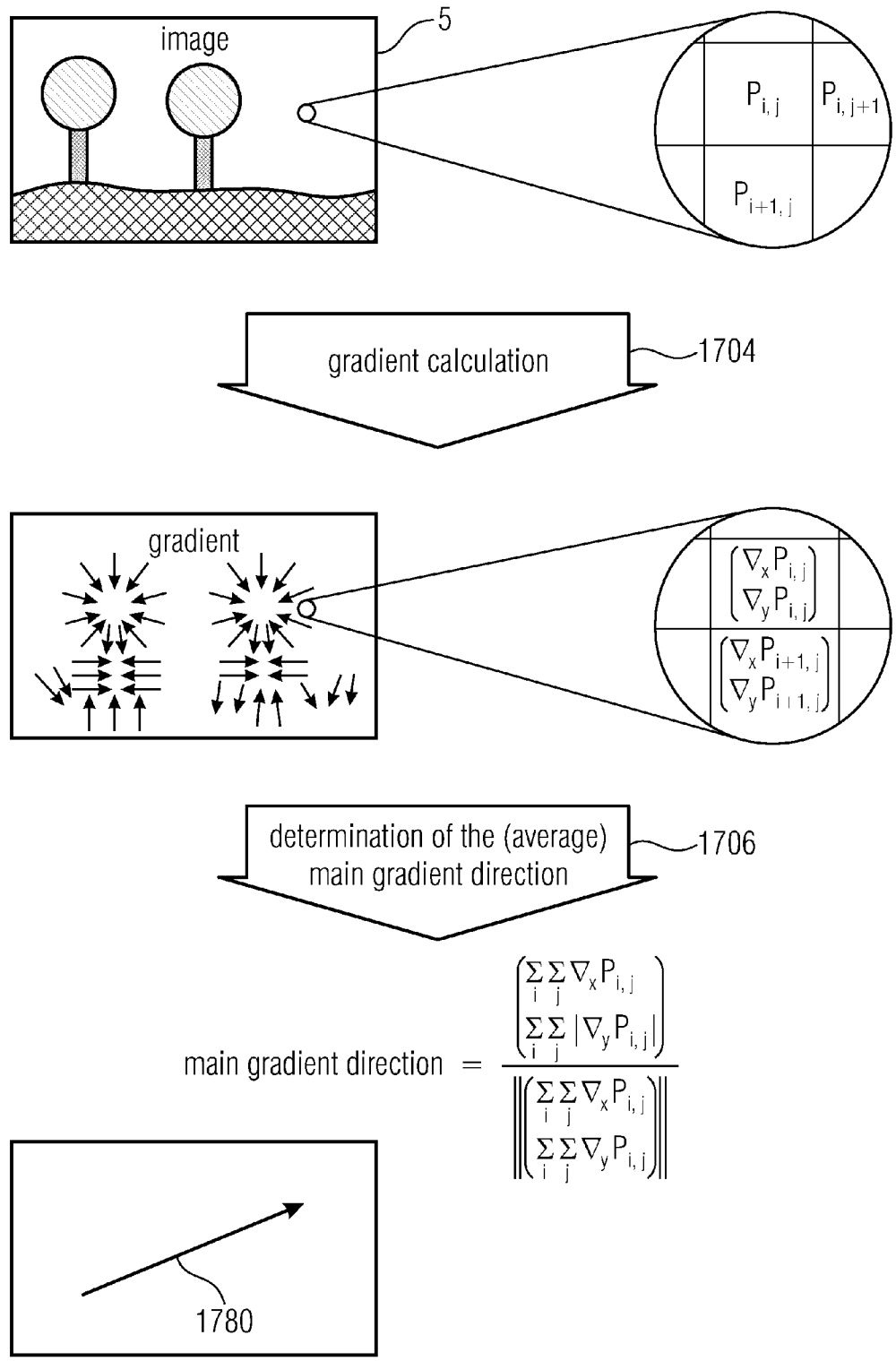
FIG. 17 is a schematic illustration of the determination of the average main gradient direction within an image.

FIG. 17 illustrates the determination of the predominant edge direction or the predominant intensity gradient direction of the overall image 5. It is assumed that the overall image 5 is described by pixels $p_{i,j}$ including gray level information or color information or several pieces of color channel information. Here, i is the row index and j is the column index. For each pixel $p_{i,j}$, a local gradient $\nabla p_{i,j}$ can be calculated (reference number 1704) which indicates a direction and an amount. The local gradient can also be expressed in Cartesian coordinates as $\nabla_x P_{i,j}$ and $\nabla_y P_{i,j}$. An average main gradient direction of the image 5 can be calculated by means of the following formula:

$$g = \frac{\begin{pmatrix} \sum_i \sum_j \nabla_x p_{i,j} \\ \sum_i \sum_j |\nabla_y p_{i,j}| \end{pmatrix}}{\left\| \begin{pmatrix} \sum_i \sum_j \nabla_x p_{i,j} \\ \sum_i \sum_j \nabla_y p_{i,j} \end{pmatrix} \right\|}$$

wherein
p image content of the projected overall image,
$p_{i,j}$ pixel value of the projected overall image at the position i,j,
$\nabla_x P_{i,j}$ x component of the gradient of p at the position i,j,
$\nabla_y P_{i,j}$ y component of the gradient of p at the position i,j.

Due to the 180-degree rotational symmetry, it is sufficient to consider the amount of the y-component of the local gradient. In the numerator of the fraction, the local gradients are summed up component by component across the overall image 5. The denominator normalizes the main gradient direction based on the amount of the vector in the numerator, which is obtained by summing up. Normalizing might be omitted. Further, it is possible to determine the geometric average by squaring the gradient components prior to summing up, i.e. for example $$\sum_i \sum_j (\nabla_x p_{i,j})^2.$$

However, it is also possible to weight the x component more strongly than the y-component or vice versa. The calculation can also be performed based on polar coordinates, in which case different gradient directions can be weighted differently. The main gradient direction 1780 is symbolically illustrated at the bottom of FIG. 17 as an arrow directed from the bottom left to the top right. It should be noted that the main gradient direction or predominant gradient direction 1780 is normally exactly or almost approximately orthogonal to the predominant edge direction of the image 5.

Figure 18:
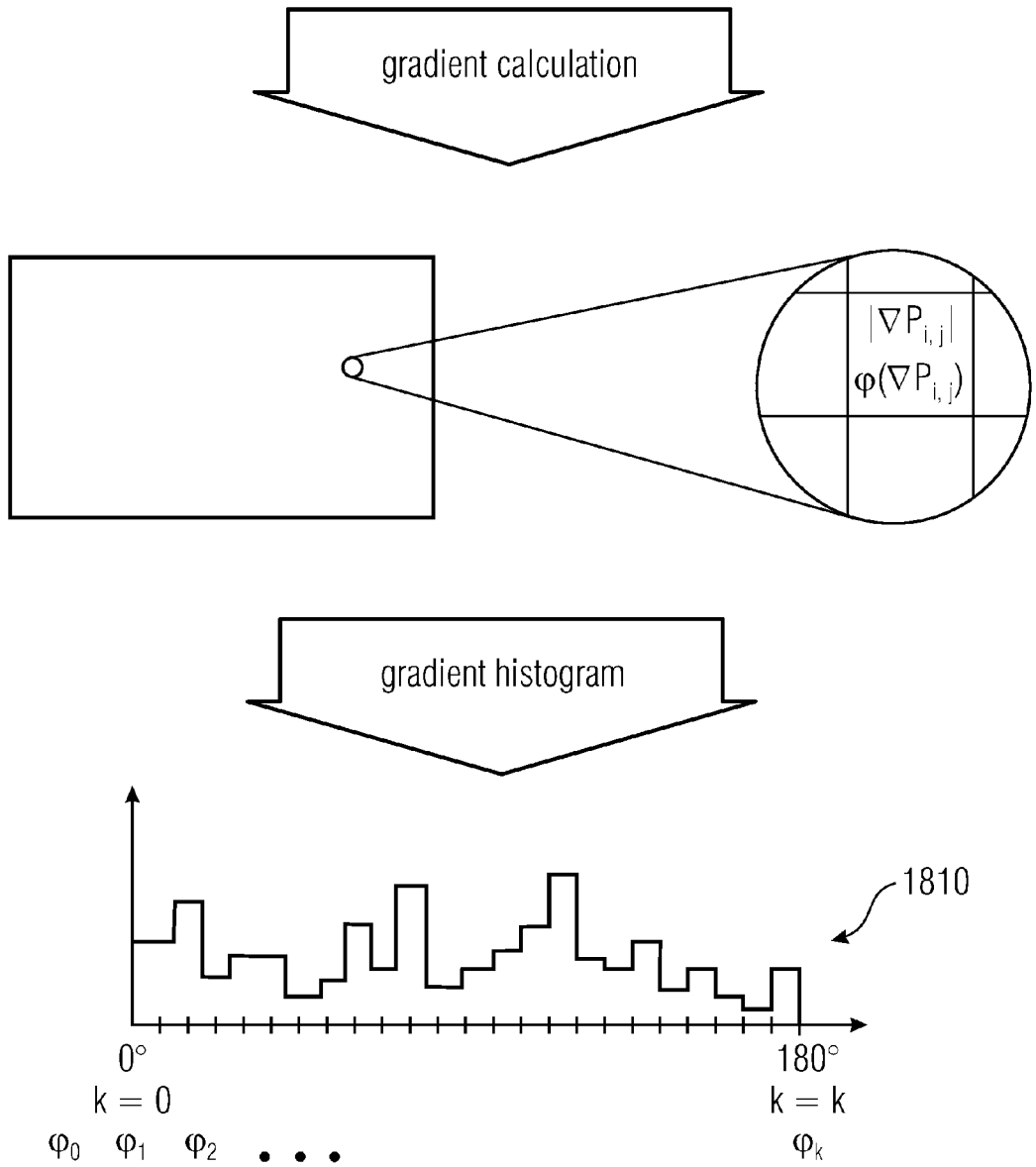
FIG. 18 is a schematic illustration of the histogram-based determination of the main gradient direction within an image.

FIG. 18 schematically illustrates the determination of the main gradient direction or the predominant (intensity) gradient direction by means of histogram evaluation. As in FIG. 17, the local gradients within the image 5 are calculated first. Alternatively, it is also possible that the local gradients are merely calculated in one image section, in several image sections or on a random basis. Here, the local gradients are expressed in polar coordinates due to the planned further processing, wherein $|\nabla p_{i,j}|$ expresses the amount and $\phi(\nabla p_{i,j})$ expresses the angle of the gradient at the position i,j. The totality of the evaluated local gradients can be represented in the form of a gradient histogram 1810 which expresses how many of the evaluated local gradients have a specific direction or are within a specific direction sector. Due to the 180-degree rotational symmetry, it is sufficient when the angular range of 0 degrees to 180 degrees is considered. This angular range can now be divided into a plurality of angle intervals, e.g. into K=18 angle intervals at 10 degrees each. The index k runs from 0 to K−1 and the $k^{th}$ angle interval thus includes the directions of $\phi_k = k*10$ degrees to $\phi_{k+1} = (k+1)*10$ degrees. The amount of the local gradients can also be considered:

$$\text{histogram}_k = \sum_{\varphi(\nabla p_{i,j}) \in [\varphi_k; \varphi_{k+1}]} |\nabla p_{i,j}|.$$

The main gradient direction can then be determined as the maximum within the histogram values. The predominant edge direction can be assumed as the direction orthogonal thereto. Within the sum, the amount of the local gradient can be weighted by a weighting function, for example by squaring the amount of the local gradient, so that high gradient amounts (i.e. more abrupt light-dark transitions or color transitions) are accordingly considered even more than gradual light-dark or color transitions.

Figure 19:
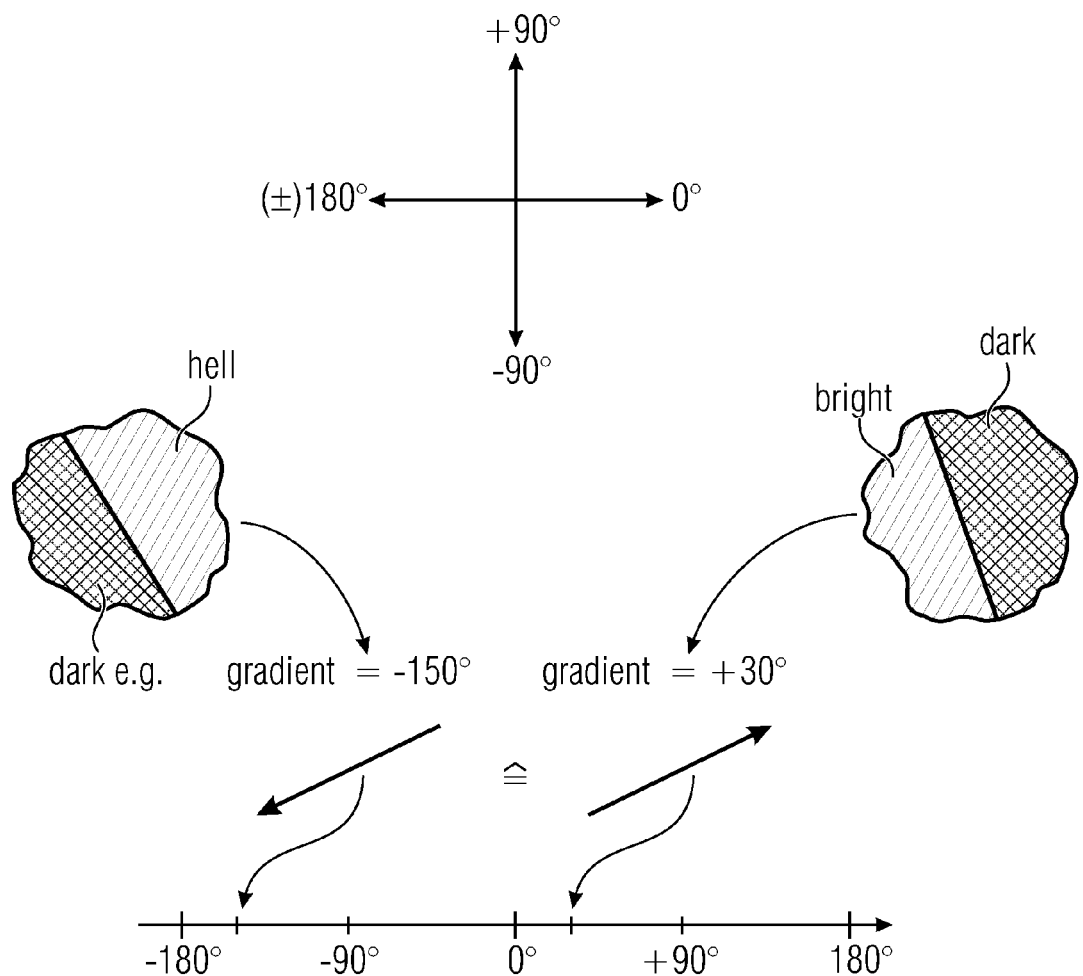
FIG. 19 is a schematic illustration of the context between the predominant edge direction and the main gradient direction within an image.

FIG. 19 schematically illustrates the 180-degree rotational symmetry. It is assumed that a first overall image 5 comprises a light-dark edge (in FIG. 19 shown on the left) that runs at an angle of approx. −60 degrees, wherein the dark image area is on the left below the edge and the light image area on the right above the edge. A second overall image 5 comprises a light-dark edge which also runs at an angle of approx. −60 degrees, wherein the dark image area is now on the right above the edge and the light image area on the left below. In the first case (on the left in FIG. 19), the gradient has a direction of −150 degrees from light to dark. In the second case (at the right in FIG. 19), the gradient has a direction of +30 degrees. For the purpose of orienting the main aperture axis, both gradient directions are essentially equivalent. Thus, it is sufficient to consider the angular range of 0 degrees to 180 degrees, for example.

Possible applications for the above embodiments are in the field of personal communication and entertainment electronics and data visualization at home and in the mobile field. A further field of application is in the field of automotive and aircraft in the form of a "head-up display" for projected illustration of driving condition information, navigation, environmental information as driver assistance systems or for entertaining passengers. Applications in measurement and medical technologies as well as display applications in industrial and production plants are also possible. Using the above projection displays as illumination unit, front headlights, effect illumination, such as for automobiles, is also possible.

Further fields of application are in the realization of projection and illumination systems on tilted and optionally curved areas for 3D measurement, machine vision, automotive, architecture, domestic infotainment (e.g. domestic communication field, kitchen projections), illumination as well as ophthalmology and general medical applications (e.g. illuminating the curved retina).

While some aspects have been described in the context of an apparatus, it is obvious that these aspects also represent a description of the respective method, so that a block or a component of an apparatus can also be seen as a respective method step or feature of a method step. Analogously, aspects that have been described in the context of one or as a method step also represent the description of a respective block or detail or feature of a respective apparatus. Some or all of the method steps can be performed by a hardware apparatus (or by using a hardware apparatus), such as a microprocessor, a programmable computer or an electronic circuit. In some embodiments, some or several of the most important method steps can be performed by such an apparatus.

Depending on specific implementation requirements, embodiments of the invention can be implemented in hardware or in software. The implementation can take place by using a digital memory medium, for example a floppy disc, a DVD, a Blu-ray disc, a CD, an ROM, a PROM, an EPROM, an EEPROM or a FLASH memory, a hard drive or any other magnetic or optical memory on which electronically readable control signals are stored that can cooperate or cooperate with a programmable computer system such that the respective method is performed. Thus, the digital memory medium can be computer-readable.

Some embodiments according to the invention also comprise a data carrier comprising electronically readable control signals that are able to cooperate with a programmable computer system such that one of the methods described herein is performed.

Generally, embodiments of the present invention can be implemented as a computer program product with a program code, wherein the program code is effective to perform one of the methods when the computer program product runs on a computer.

The program code can, for example, also be stored on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein when the computer program runs on a computer.

Thus, a further embodiment of the inventive methods is a data carrier (or a digital memory medium or a computer-readable medium) on which the computer program for performing one of the methods described herein is recorded.

Thus, a further embodiment of the inventive method is a data stream or a sequence of signals representing the computer program for performing one of the methods described herein. The data stream or the sequence of signals can be configured in order to be transferred via a data communication connection, for example via the internet.

A further embodiment includes a processing means, for example a computer or a programmable logic device that is configured or adapted to perform one of the methods described herein.

A further embodiment includes a computer on which the computer program for performing one of the methods described herein is installed.

A further embodiment according to the invention includes an apparatus or a system that is implemented to transmit a computer program for performing at least one of the methods described herein to a receiver. The transmission can be performed, for example, electronically or optically. The receiver can be, for example, a computer, a mobile device, a memory device or a similar apparatus. The apparatus or the system can be, for example, a file server for transmitting the computer program to the receiver.

In some embodiments, a programmable logic device (for example a field-programmable gate array, an FPGA) can be used to perform some or all functionalities of the methods described herein. In some embodiments, a field-programmable gate array can cooperate with a microprocessor to perform one of the methods described herein. Generally, the methods are performed in some embodiments by means of any hardware apparatus. The same can be universally usable hardware such as a computer processor (CPU) or hardware specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Projection display comprising
   an imager that is implemented to generate individual images in a distribution of sub-areas of an imaging plane of the imager;
   a multi-channel optics comprising channels, which is configured to map one allocated sub-area of the imager each per channel, such that the mappings of the individual images are combined to an overall image in a projection area, wherein
   the channels of the multi-channel optics are arranged in an elongated array; and
   the multi-channel optics includes a larger artificial aperture in a direction along at least one elongated image feature than a direction orthogonal to the direction along the at least one elongated image feature, so that a two-dimensional anisotropic out-of-focus behavior of each projected image point is acquired.

2. Projection display according to claim 1, wherein the channels of the multi-channel optics form a two-dimensional array which comprises more channels in a longitudinal direction than in a transverse direction.

3. Projection display according to claim 2, wherein the two-dimensional array of the stated channels of the multi-channel optics forms a contiguous area.

4. Projection display according to claim 1, wherein the elongated array of the channels of the multi-channel optics incorporates an angle between 80 degrees and 100 degrees with a predominant intensity gradient direction of the overall image.

5. Projection display according to claim 1, wherein the imager is a static imager and the overall image is predetermined.

6. Projection display according to claim 1, wherein the imager is a dynamic imager and a preferential direction of the at least one image feature of the overall image has been previously known or determined within a tolerance range.

7. Projection display according to claim 1, wherein the multi-channel optics is configured to partly or completely superimpose the mappings of the individual images.

8. Projection display according to claim 1, wherein the channels of the multi-channel optics form a two-dimensional array comprising one or several areas with respective envelopes of the channels, wherein the area or the contiguous areas are similar to the at least one elongated image feature with respect to the orientation.

9. Projection display according to claim 1, wherein the channels of the multi-channel optics comprise a small sub-aperture and a high depth of focus compared to the overall multi-channel optics, so that the mappings of the individual images considered individually are focused across a comparatively large range of a distance between the multi-channel optics and the projection area.

10. Projection display according to claim 1, wherein at least some of the channels of the multi-channel optics are arranged in a symbol-like sub-aperture array in order to acquire a symbolic out-of-focus behavior for varying projection distances, which corresponds to the symbol-like sub-aperture array.

11. Projection display according to claim 1, wherein the multi-channel optics comprises a one-dimensional channel array, a concentric channel array, a square channel array, a hexagonal channel array or a stochastic channel array.

12. Projection display according to claim 1, wherein the multi-channel optics comprises further channels arranged in a second elongated array whose orientation differs from the first elongated array, and wherein the projection display further comprises a control activating, in dependence on a predominant image feature direction in the overall image, the first elongated array or the second elongated array or both the first and second elongated arrays for the projection of the overall pattern by activating sub-areas of the imager allocated to the respective activated channels.

13. Projection display according to claim 12, further comprising a plurality of individually controllable light sources, wherein each light source is allocated to a channel of the multi-channel optics and the allocated sub-area of the imager, and wherein activating the sub-areas of the imager comprises activating the allocated light sources or is effected thereby.

14. Projection display according to claim 1, wherein the at least one elongated image feature is a part of a fringe pattern or a light-dark transition.

* * * * *